United States Patent

[11] 3,554,352

| [72] | Inventor | Thomas F. Hillman<br>Corning, N.Y. |
|---|---|---|
| [21] | Appl. No. | 801,683 |
| [22] | Filed | Feb. 24, 1969 |
| [45] | Patented | Jan. 12, 1971 |
| [73] | Assignee | Corning Glass Works<br>Corning, N.Y.<br>a corporation of New York |

[54] ARTICLE HANDLING
15 Claims, 26 Drawing Figs.

[52] U.S. Cl.................................................. 198/21,
198/27, 198/33, 198/35, 214/1
[51] Int. Cl........................................................B65g 47/24,
B65g 47/80, B65g 47/91
[50] Field of Search......................................... 356/124–
—127; 198/209, 107, 33(R2), 27, 33(R4);
214/1(BS3), 1(BS2), 7

[56] References Cited
UNITED STATES PATENTS

| 2,351,200 | 6/1944 | George et al. | 198/209 |
|---|---|---|---|
| 3,047,124 | 7/1962 | Wexler | 198/33(R4) |
| 3,232,302 | 2/1966 | Methot | 198/33(R2) |
| 3,297,134 | 1/1967 | Pastuszak | 198/33(R2) |

*Primary Examiner*—Evon C. Blunk
*Assistant Examiner*—Roger S. Gaither
*Attorneys*—Clarence R. Patty, Jr. and Charles W. Gregg ABSTRACT: An apparatus for correspondingly rotatively orienting each of a series or succession of similar and relatively flat or dishlike articles having generally curved outer peripheries such as, for example, lens blanks for spectacles or other types of eyeglasses, and for stacking predetermined quantities of the oriented articles of said series or succession in rows for delivery to a station such as an article inspection station.

INVENTOR.
Thomas F. Hillman
BY Charles W. Gregg
AGENT

INVENTOR.
Thomas F. Hillman
BY Charles W. Gregg
AGENT

INVENTOR.
Thomas F. Hillman
BY Charles W. Gregg
AGENT

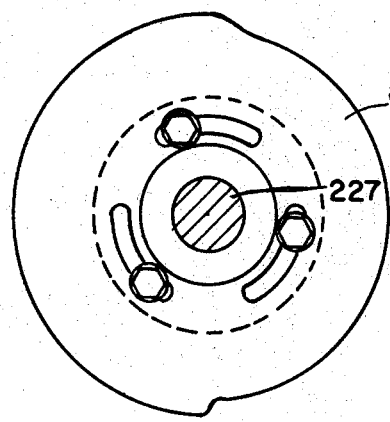
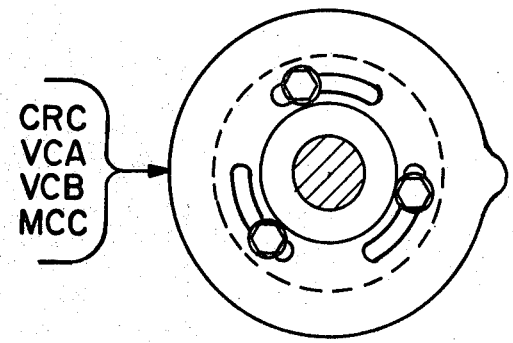
Fig. 14    Fig. 15
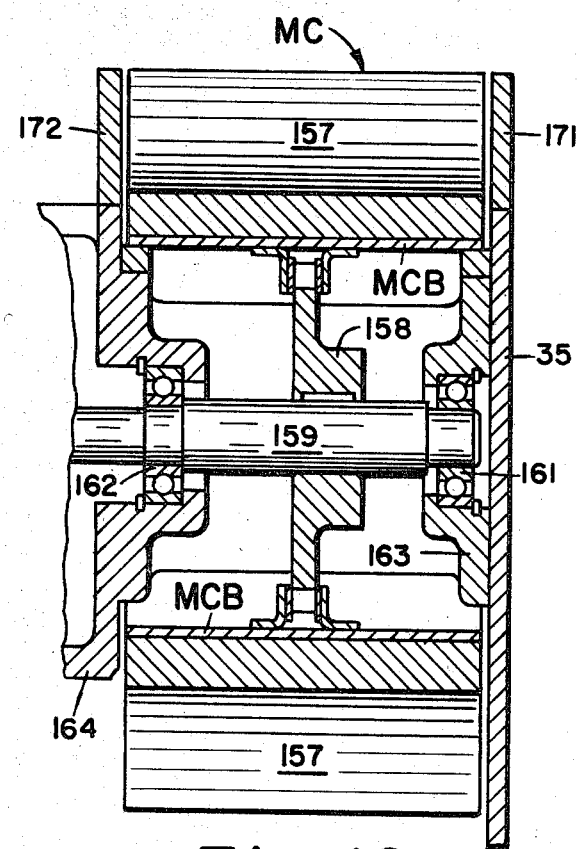
Fig. 16
INVENTOR.
Thomas F. Hillman
BY Charles W. Gregg
AGENT

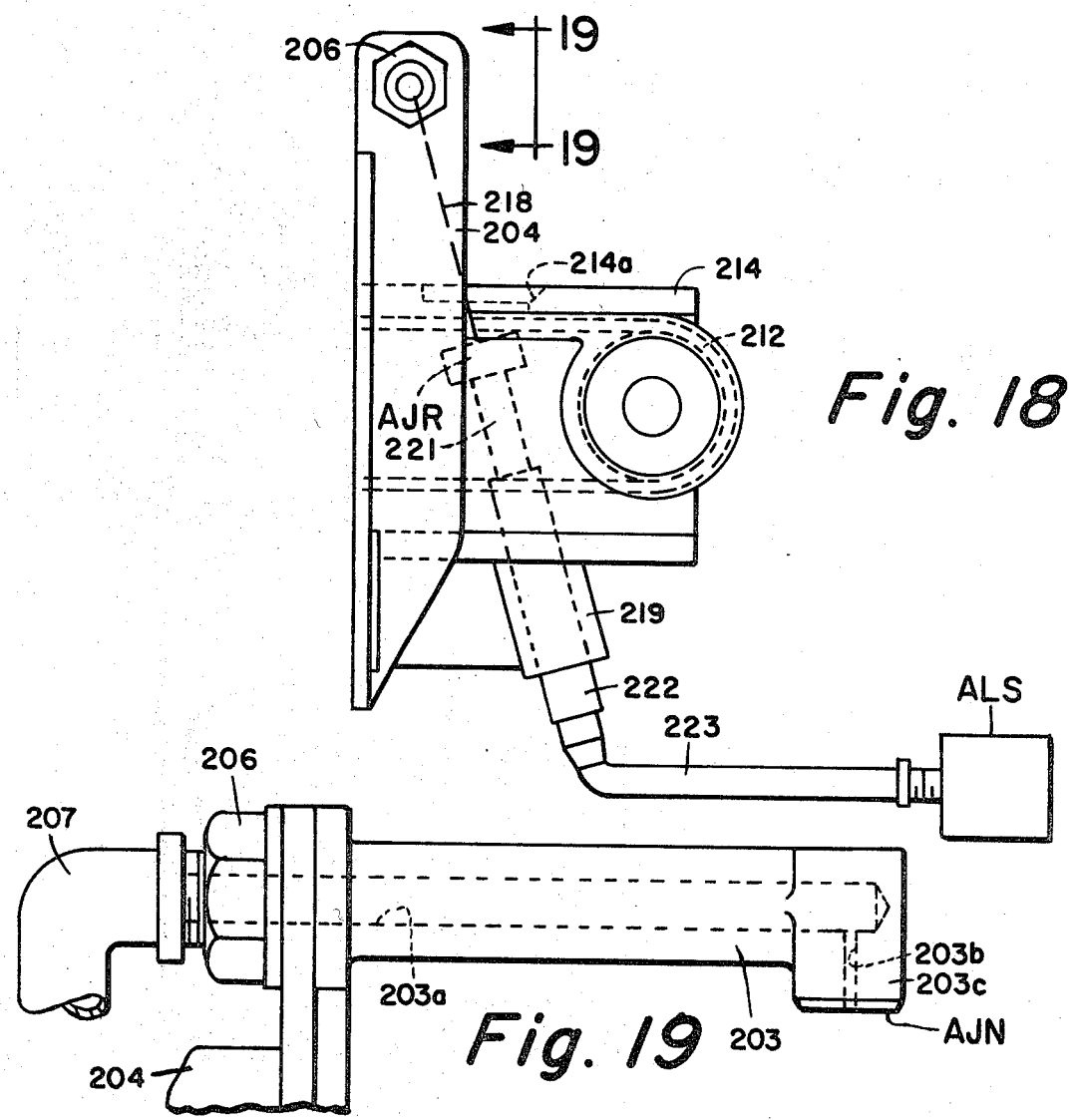
Fig. 18
Fig. 19
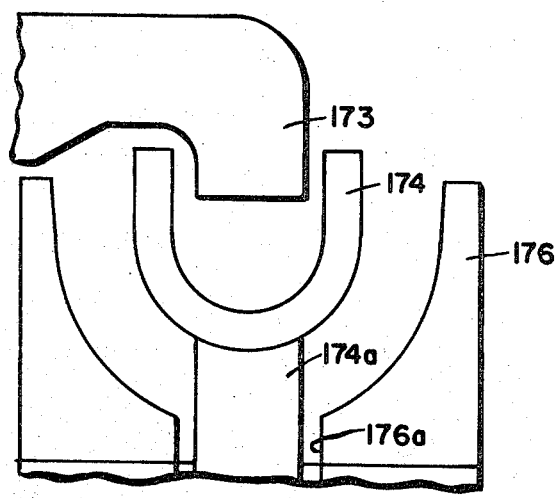
Fig. 20
INVENTOR.
Thomas F. Hillman
BY Charles W. Gregg
AGENT INVENTOR.
Thomas F. Hillman
BY Charles W. Gregg
AGENT

ARTICLE HANDLING

BACKGROUND OF THE INVENTION

The invention relates to apparatus for correspondingly rotatively orienting and stacking equal quantities of a succession or series of similar dishlike articles in magazines carried on a conveyor belt for delivery of such articles to a station such as an inspection or packaging station. Said articles may, for example, be lens blanks for spectacles or other types of eyeglasses.

For the purpose of inspection of optical lens blanks for flaws, for example, predetermined quantities of such blanks are often stacked in a face-to-face relationship with each other, that is, with the planar surfaces of each blanks of a stack thereof contacting the planar surfaces of the adjoining blanks of such stack. Such stacking operations have heretofore usually been performed by hand by an operator who also rotatively correspondingly orients the blanks if they have a peripheral configuration other than circular. For obvious economic reasons it has been found desirable to eliminate such manual orientation and stacking of the lens blanks, and to perform such operations automatically. Apparatus previously designed for such operations has been found to be unsatisfactory for various reasons. It is, accordingly, an object of the present invention to provide a reliable and relatively rapidly operating apparatus for correspondingly rotatively orienting equal quantities of dishlike articles such as optical lens blanks, for example, and for stacking each such quantity of stacked articles in said face-to-face relationship at one station for delivery to an operator at another station such as a packaging or inspection station.

SUMMARY OF THE INVENTION

In accomplishing the above object of the invention, there is provided a rotating table which carries adjacent its outer periphery a plurality of article supporting and orienting members, a first oscillatory or reciprocating vacuum chuck which individually loads each of a succession or series of the articles being handled into one of said supporting members for rotative orienting of the article, and a second oscillatory or reciprocating vacuum chuck which removes said articles from their supporting members and transfers each such member in a loading trough for stacking predetermined quantities of the articles in magazines carried by a conveyor belt for delivery to a station for subsequent operations, such as inspection or packaging, to be performed on the stacked articles.

BRIEF DESCRIPTION OF THE DRAWINGS

In the drawings:

FIGS. 14 and 15 comprise further detail views of parts of the apparatus embodying the invention;

FIG. 16 is a cross-sectional view on an enlarged scale and taken generally along line 16-16 of FIG. 9;

FIG. 18 is an enlarged elevational view of part of the apparatus of FIG. 1 taken generally along line 18-18 of FIG. 1;

FIG. 19 comprises an elevational view on an enlarged scale and taken generally along line 19-19 of FIG. 18;

FIG. 20 is an elevational view, on an enlarged scale, taken along line 20-20 of FIG. 17;

Similar reference characters refer to similar parts in each of the FIGS. of the drawings.

PREFERRED EMBODIMENT OF THE INVENTION

Before discussing the apparatus of the invention in detail, it is pointed out that a suitable source of electrical current of sufficient voltage and capacity for actuating the electrical components employed in the invention is provided but, for purposes of simplification of the drawings, such source is not shown therein. However, the opposite terminals of the current source are designated BX and NX, respectively. There is also provided a suitable source of pressurized fluid, such as compressed air for example, and a suitable source of vacuum for energization of the pneumatic components employed in the invention but such source is also not shown therein for purposes of simplification of the drawings.

The rotary cams shown in FIGS. 10, 11, 12, 14, 15, 25 and 26 are not intended to be shown in the positions which they occupy in relationship with each other but such relationship will be readily understood, by those skilled in the art, from the operational example of the invention set forth in the latter part of the specification.

Figure 1:
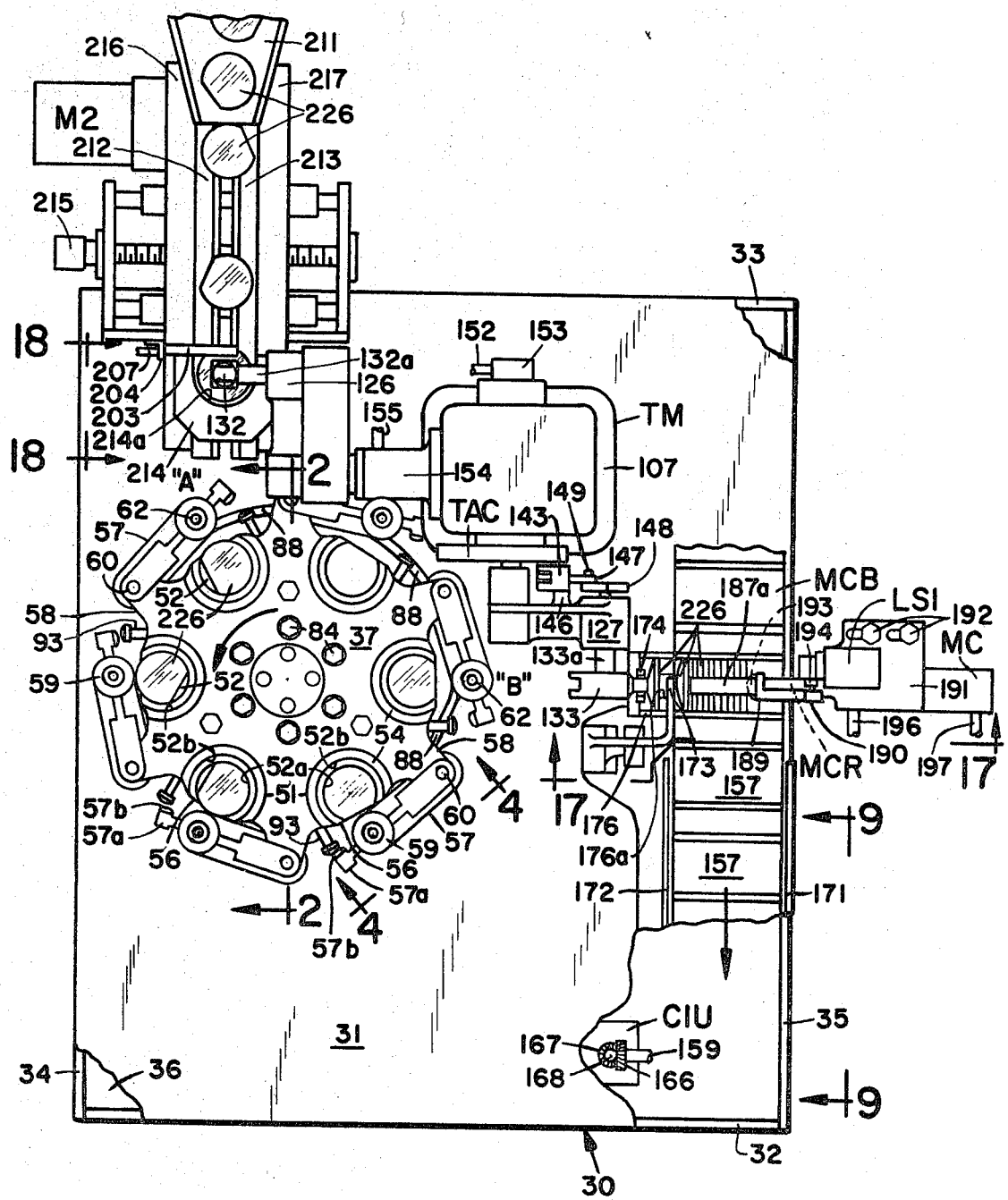
FIG. 1 is a top plan view of the apparatus embodying the invention.
Figure 2:
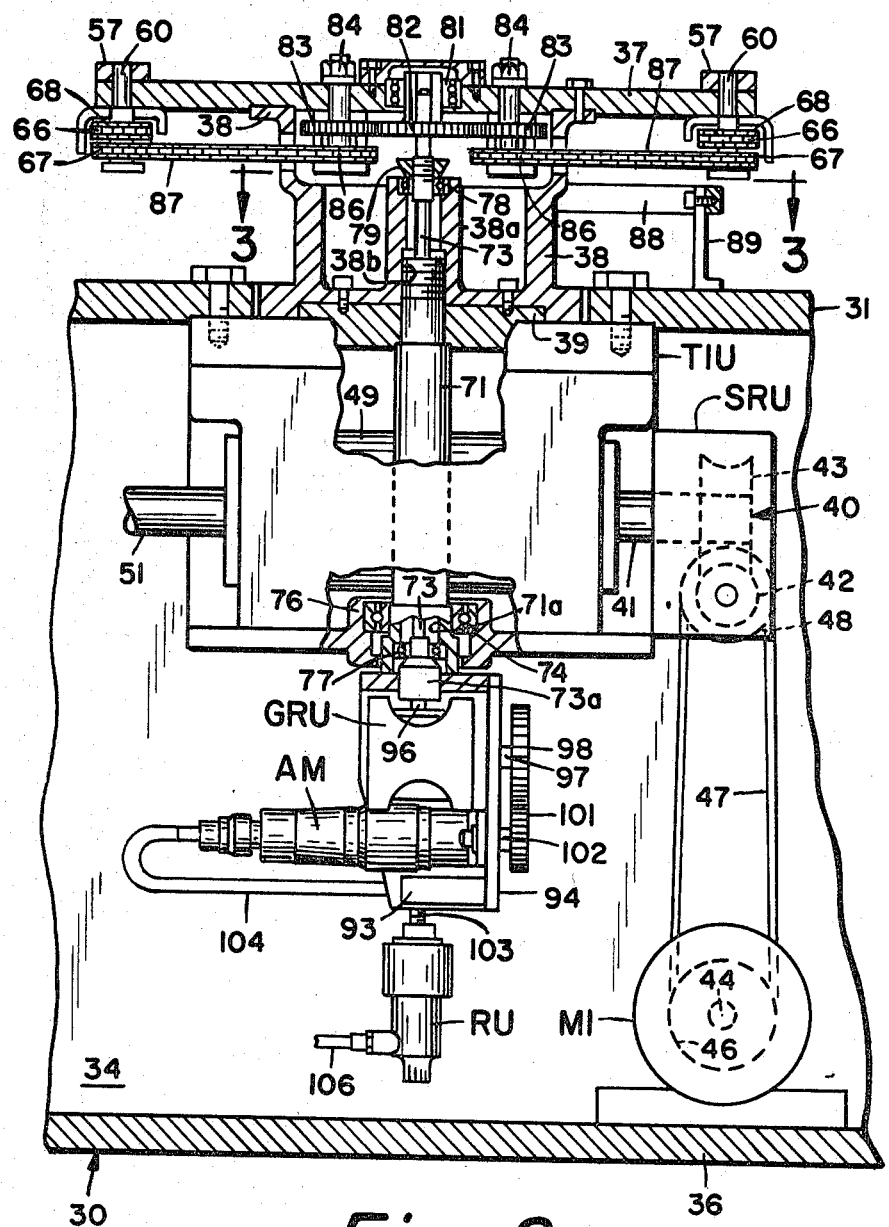
FIG. 2 is a partial cross-sectional view of part of the apparatus of FIG. 1 such view being on an enlarged scale and taken generally along line 2-2 of FIG. 1.

Referring now to the drawings in detail, there is shown in FIGS. 1 and 2 a boxlike enclosure 30 comprising a top platform member 31, front and back support members 32 and 33, respectively, left and right hand side support members 34 and 35, respectively, and a base member 36. A rotatable table 37 is supported upon the top of an upright pedestal type of support 38 (FIG. 2) which is secured to the indexing turret 39 of a table indexing unit TIU. Indexing unit TIU is, in turn, secured to the underside of platform member 31. Thus, pedestal support 38 and table 37 are rotated in unison with the rotation of the indexing turret 39 of indexing unit TIU.

Indexing units such as TIU are well known in the art and such unit may, for example, be a "Series D" type of indexing unit which may be obtained from Swanson-Erie Corporation whose address is 814 East Eighth Street, Erie, Pa. As shown in FIG. 2 of the drawings unit TIU includes a speed reduction unit SRU which is integral with the indexing unit. Speed reduction unit embodies a worm gear 40 including a worm 42 and a worm wheel 43 (FIGS. 2 and 25) which is mounted on the input shaft 41 of the indexing unit TIU. The output shaft 44 of a prime mover or main drive motor M1 is provided with a suitable pulley or sprocket 46 about which a drive belt or chain 47 is looped. Such belt or chain also loops about a suitable pulley or sprocket 48 which is connected to the worm 42 of worm gear 40 in speed reduction unit SRU.

Indexing unit TIU embodies a barrel cam 49 which is rotated by the driven rotation of input shaft 41 of the unit by prime mover M1. Indexing unit TIU also includes an output shaft 51 which is rotated in unison with barrel cam 49 and input shaft 41, and which will be discussed further later. The indexing turret 39 of unit TIU is indexed through a 60° arc of rotation with each full revolution of barrel cam 49, such rotation of indexing turret 39 being performed by a cam follower which follows a cam track on the outer periphery of barrel cam 49. Such cam follower and cam track are not shown in the drawings since they are integral parts of unit TIU, such units being well-known in the art as previously mentioned. It is, however, expedient to point out that the cam track on barrel cam 49 is so arranged that, in each full or 360° revolution of such barrel cam, indexing turret 39 dwells in one position during 240° of each such revolution of the barrel cam. Thus, support 38 and table 37 are intermittently stepped, along with indexing turret 39 of unit TIU, through 60° arcs of rotation with dwell periods between each such arc. As an example, if barrel cam 49 rotates 1 full revolution in 6 seconds, support 38 and table 37 are indexed between each dwell position and the following dwell position in 2 seconds, and such members then dwell in each such following dwell position for 4 seconds. Following such 4-second dwell period, indexing turret 39, support 38, and table 37 are again stepped or indexed 60° in 2 seconds to the next following dwell position where they again dwell for a 4-second period. Such operation continues so long as barrel cam 49 continues to rotate one full or 360° revolution each six seconds. However, such speed can be varied as hereinafter discussed.

Figure 22:
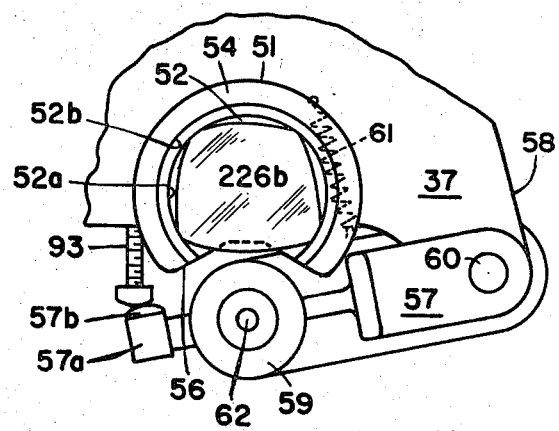
Figure 23:
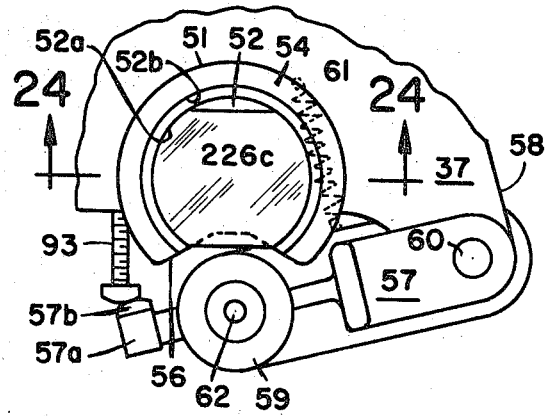
Figure 24:
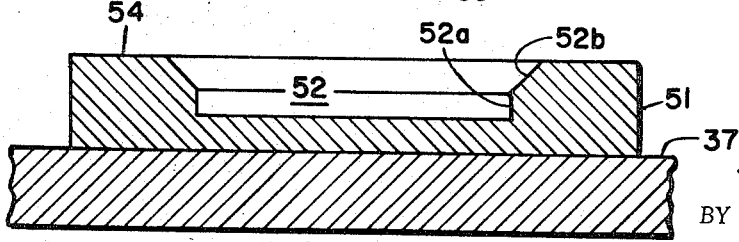
FIG. 24 is a cross-sectional view on an enlarged scale, and taken along line 24-24 of FIG. 23 to further illustrate the shape of article or lens supporting and orienting members of the invention.

Referring further to FIG. 1 of the drawings, a plurality of article supporting members, such as 51, are secured in any convenient manner to the top surface of table 37 at equally spaced intervals about and adjacent the outer periphery of the table. It is pointed out that the supporting members such as 51 are not shown in FIG. 2 of the drawings for purpose of simplification thereof. As best illustrated in FIG. 24 taken in conjunction with FIGS. 1, 21, 22 and 23 of the drawings, each article supporting member such as 51 embodies an open top, shallow cavity 52, the lower portion 52a of which has a horizontal planar shape of a major segment of a circle whose diameter corresponds to the largest diameter of the rims of the articles, such as optical lens blanks, which are to be handled by the apparatus of the invention. The upper portions 52b of the cavities such as 52 slope upward and outward from the center of the cavities as best shown in FIG. 24. The perimeters of the cavities such as 52 are defined by arcuate inner surfaces of walls, such as 54, each of which walls has a gap 56 therein (FIGS. 1, 21, 22 and 23).

Figure 21:
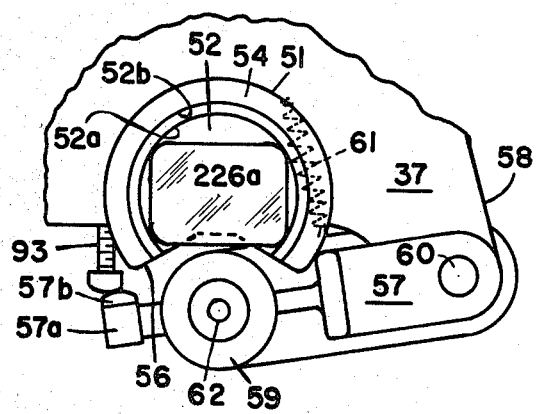
FIGS. 21, 22 and 23 are views illustrating the manner in which different shaped optical lens are rotationally oriented by apparatus of the invention.

A lever such as 57 (FIGS. 1, 4, 21, 22 and 23) is associated with each article support member such as 51. The levers, such as 57, are each pivotally connected, as by axles 60 adjacent one end of each of the levers, to respectively associated and radially extending extensions, such as 58, of table 37, such extensions being equally spaced about the outer periphery of such table. The second ends of the levers such as 57 pivotally support, by axles such as 62, frictional wheels, or rollers, such as 59, which may, for example, be made of rubber of a suitable hardness. This will be further discussed hereinafter in the description. As best illustrated in FIGS. 21, 22 and 23, said second ends of the levers such as 57 are provided with extensions such as 57a, and such levers and the extensions thereof are resiliently biased, by expansion springs such as 61, inwardly and towards the center of table 37. This will also be further discussed hereinafter.

The wheels such as 59 are keyed in any convenient manner to their respective pivots or axles 62 so as to be rotatable therewith. A sprocket wheel, such as 63, is attached to the lower end of each of the axles, such as 62, and each such wheel is keyed to its respective axle 62 in any convenient manner (FIG. 4) so as also to be rotatable therewith. A pair of sprocket wheels, such as 66 and 67, are keyed to the lower end of each respective axle, such as 60 (FIGS. 2 and 4) and a suitable link drive chain, such as 68 (FIG. 4) loops about each respective pair of sprocket wheels 63 and 66. It is, thus, apparent that rotation of each sprocket wheel 67 will impart a corresponding rotation to the respectively associated sprocket wheel 66 and, through the respectively associated chain such as 68, to the associated sprocket wheel, such as 63, to rotate the respective roller or wheel such as 59. This will be further discussed hereinafter in an operational example of the invention.

Figure 3:
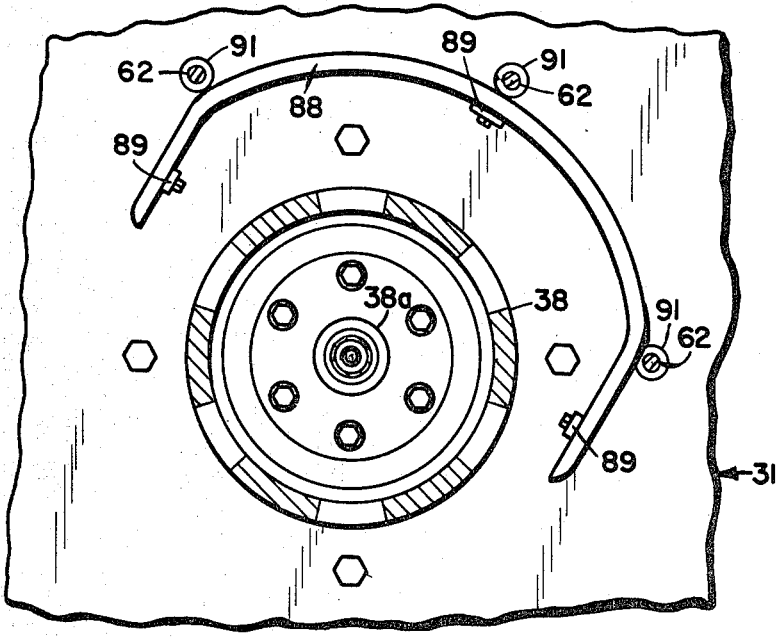
FIG. 3 comprises a plan view taken generally along line 3-3 of FIG. 2.

Indexing unit TIU, previously discussed, is modified to include a hollow shaft 71 (FIG. 2) extending vertically through the unit and through the center of indexing turret 39 of unit TIU. The upper end of shaft 71 is threaded and is screwed into cooperating threads provided in the hollow 38b of a hollow center hub portion 38a of support 38 (FIGS. 2 and 3). The hollow 71a in shaft 71 extends completely therethrough and a second shaft 73 extends through such hollow concentric therewith. The lower end of shaft 71 extends through the inner race of a ball bearing 74 whose outer race is supported in a lower hub part 76 of indexing unit TIU. The lower and upper ends of shaft 73 extend through the inner races of ball bearings 77 and 78, respectively, and the outer races of such bearings are supported in the lower end of shaft 71 and the upper end of hub portion 38a of support 38, respectively. By such arrangement it is readily apparent that shaft 71 is rotatable within bearing 74 in lower hub part 76 of unit TIU, and inner shaft 73 is separately rotatable within bearing 78 in the upper end of the hollow 38b of hub portion 38a of support 38, and within bearing 77 in the lower end of hollow 71a of shaft 71. A suitable nut 79 is screwed onto cooperating threads provided on shaft 73 near the upper end thereof and bears against the inner race of ball bearing 78 for support of shaft 73 within the hollow 71a of shaft 71, as stated.

Figure 4:
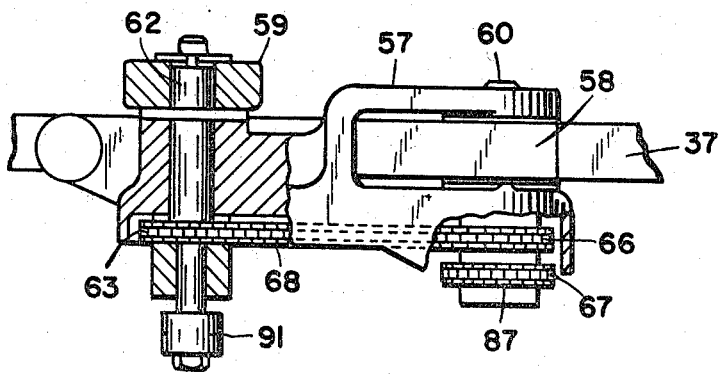
FIG. 4 is an enlarged view, partially in cross section, taken generally along line 4-4 of FIG. 1.

The extreme upper end of shaft 73 extends into the inner race of a ball bearing 81 whose outer race is supported in a hole provided in the center of table 37. A relatively large spur gear 82 is keyed in any convenient manner to shaft 73 between the previously mentioned nut 79 and the extreme upper end of shaft 73, and a plurality of six smaller spur or pinion gears, such as 83, are rotatably supported on the lower ends of suitable shafts such as 84 (FIGS. 1 and 2) whose upper ends extend through holes provided in table 37. The teeth of the gears such as 83 mesh with the teeth of gear 82 in a driven relationship therewith (FIG. 2). As is believed readily apparent, each of the gears such as 83 is associated with a different one of the levers such as 37 and a sprocket wheel such as 86 is secured to a hub portion of each of the gears in a driven relationship therewith. A link drive chain such as 87 (FIGS. 2 and 4) loops about each sprocket wheel such as 86 and the previously mentioned respective sprocket wheel, such as 67, associated with the respective lever such as 57 with which each respective gear such as 83 is associated. By such an arrangement it will be readily apparent to those skilled in the art that any rotation imparted to shaft 73, as hereinafter discussed, will impart rotation to the friction wheels 59 supported on the ends of levers 57 (FIGS. 1 and 4).

A cam or cam track 88 (FIGS. 1 through 4) is supported below table 37 and above top platform member 31 by three upright supports such as 89 whose upper ends are secured to cam or cam track 88 and whose lower ends are secured to the top surface of platform member 31 in any convenient manner. The lower end of each axle such as 62 associated with each respective lever such as 57 is provided with a roller or cam follower such as 91 (FIGS. 3 and 4) which are freely rotatable on their respective axles. Such rollers or cam followers at times come into contact with the outer surface or face of cam or cam track 88 and, at such times, the respectively associated levers 57 and their respective friction wheels 59 are actuated outwardly or farther away from the outer periphery of table 37, the levers pivoting about the axles, such as 60, at said times and such actuations being in a direction which is opposite to the previously mentioned biasing force supplied to the levers by the springs such as 61 (FIGS. 21, 22 and 23).

Table 37 further includes about its outer periphery a plurality of six evenly spaced and adjustable members, such as threaded screws 93, each of which is associated with a different one of the previously mentioned extensions such as 57a provided on the second ends of the levers such as 57. Each extension such as 57a is provided with a contact button or member 57b (FIGS. 1, 21, 22 and 23) which at times contact the heads of the screws such as 93. It will be readily apparent from the arrangement described that the distance to which the springs such as 61 can actuate their respectively associated levers inwardly toward the center of table 37 is limited by the screws such as 93 but can be adjustably varied by screwing each respective screw 93 further into or out of table 37, as is obvious.

Referring again to FIG. 2, the lower end of shaft 73 is provided with a portion 73a having a larger diameter than the remainder of the shaft and the output shaft 96 of a gear reduction unit GRU (see also FIG. 26) extends into a hollow provided in such enlarged portion of shaft 73 concentrically therewith. Portion 73a of shaft 73 is keyed in any convenient manner, to output shaft of unit GRU for driven rotation thereby. Gear reduction units such as GRU are well-known in the art and such unit may, for example, be a worm gear speed reducer 10WV40 which may be obtained from Morse Chain Company whose address is South Aurora Street, Ithaca, N.Y. Such speed reducer is listed in Catalog SP-66, Page C-17, a copy of such may be obtained from said company. However, as mentioned above such speed reducer units are well-known in the art.

There is mounted on input shaft 97 of unit GRU and keyed thereto in any convenient manner, a spur gear 98. Another spur gear 101 is mounted on the output shaft 102 of a pneumatic motor AM (FIGS. 2 and 26) and is keyed to such shaft in any convenient manner. The teeth of spur gears 98 and 101 mesh in a driven and driving relationship, respectively. Motors such as AM are also well-known in the art and such motor may, for example, be a fractional horsepower, multivane motor, size 1400M, such as sold by Ingersoll Rand Company, Liverpool, N.Y. Such motor is listed in Catalog 01967, Page 8, a copy of which may be obtained from said company. Unit GRU and motor AM are supported on a suitable bracket 94 in a substantially integral relationship with each other.

Figure 26:
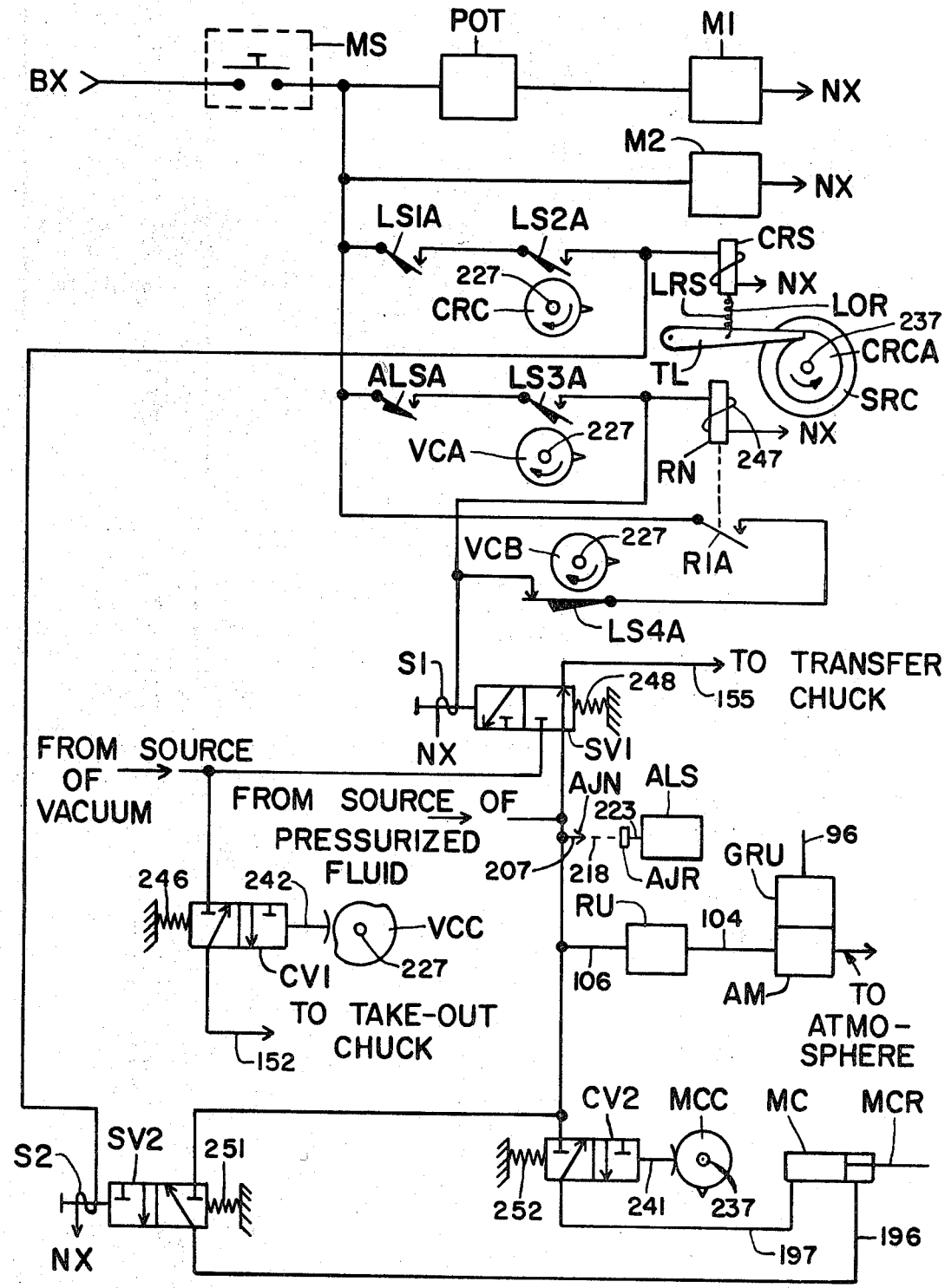
FIG. 26 is a schematic electrical wiring and pneumatic diagram illustrating connections between electric and pneumatic components employed in the apparatus embodying the invention.

A rotary union RU is shown in FIGS. 2 and 26 and the output port of such union is connected through a nipple 103 and a conduit 104 to the input port of motor AM. The output port of motor AM is open to atmosphere. The input port of union RU is connected by a conduit 106 to a suitable source of pressurized fluid such as, for example, compressed air (FIG. 26). Union RU is secured, by nipple 103, to the bottom of a support member 93 which is, in turn, fastened to the previously mentioned bracket 94, as by welding for example. Bracket 94 is secured, as by welding, to the lower end of shaft 71.

By the arrangement just described it will be apparent that pressurized fluid such as compressed air supplied to union RU will flow through such union, and through nipple 103 and conduit 104 to energize motor AM. Motor AM will thus be caused to rotate and, through gear reduction unit GRU, will cause rotation of shaft 73, gears 82 and 83, and sprocket wheels 86, 67, 66 and 63. The wheels or rollers such as 59 (FIGS. 1 and 4) adjacent the second ends of levers 57 will also be rotated as a result of rotation of sprocket wheel 63.

Figure 5:
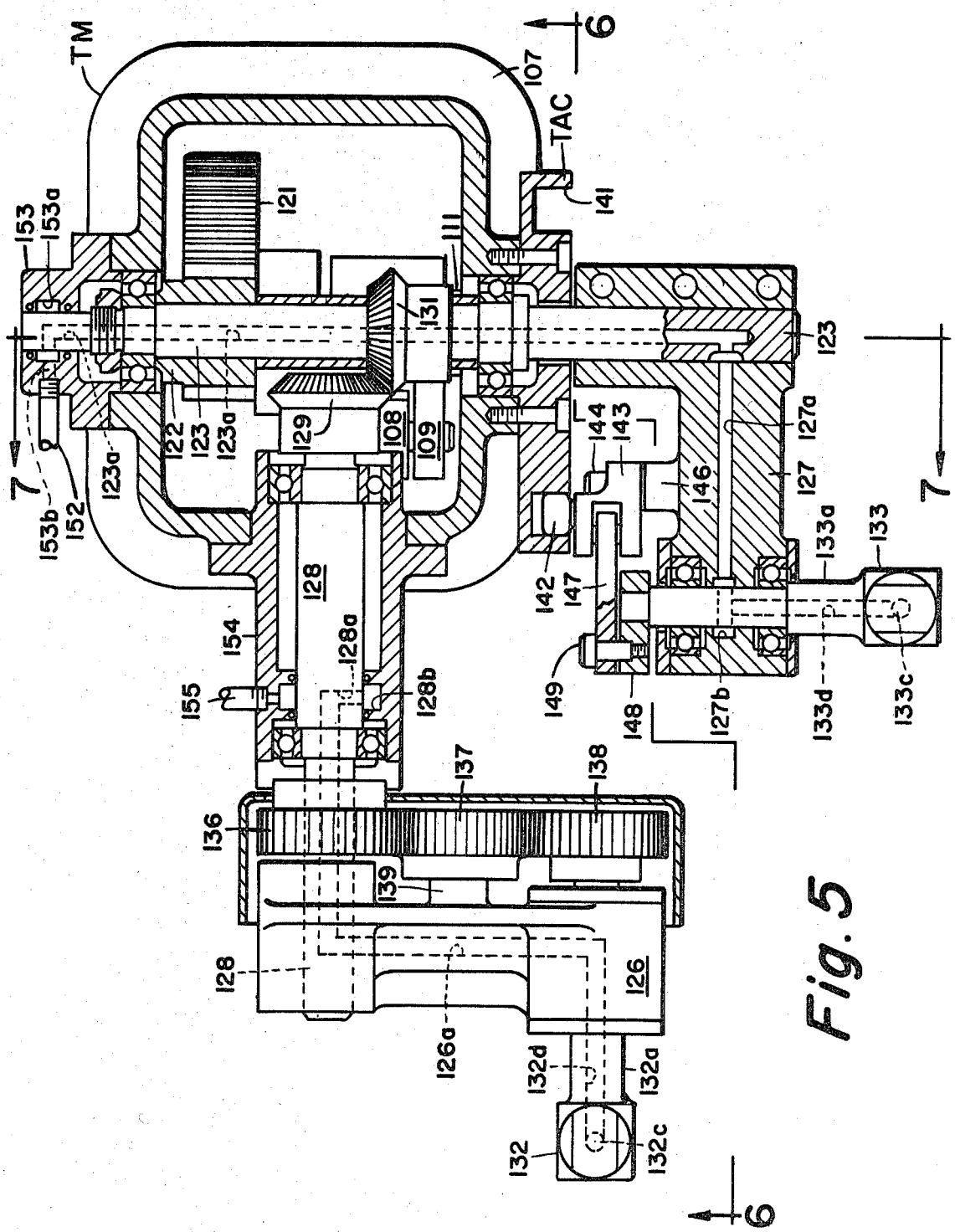
FIG. 5 is a partially cross-sectional view, on an enlarged scale, of a transfer mechanism TM shown in FIG. 1 and illustrating part of the internal structure of such mechanism.
Figure 6:
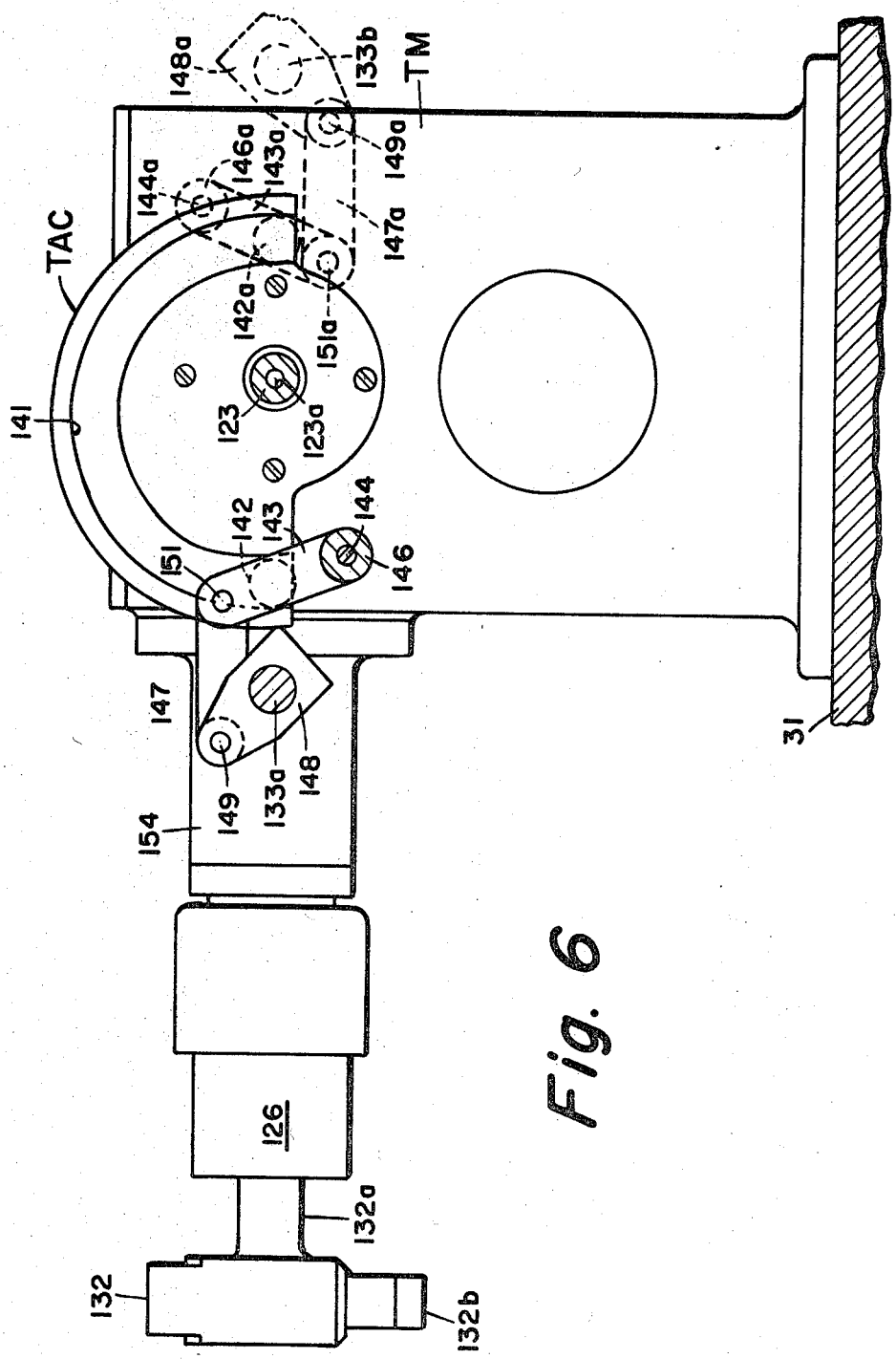
FIG. 6 is an elevational view taken generally along line 6-6 of FIG. 5.
Figure 7:
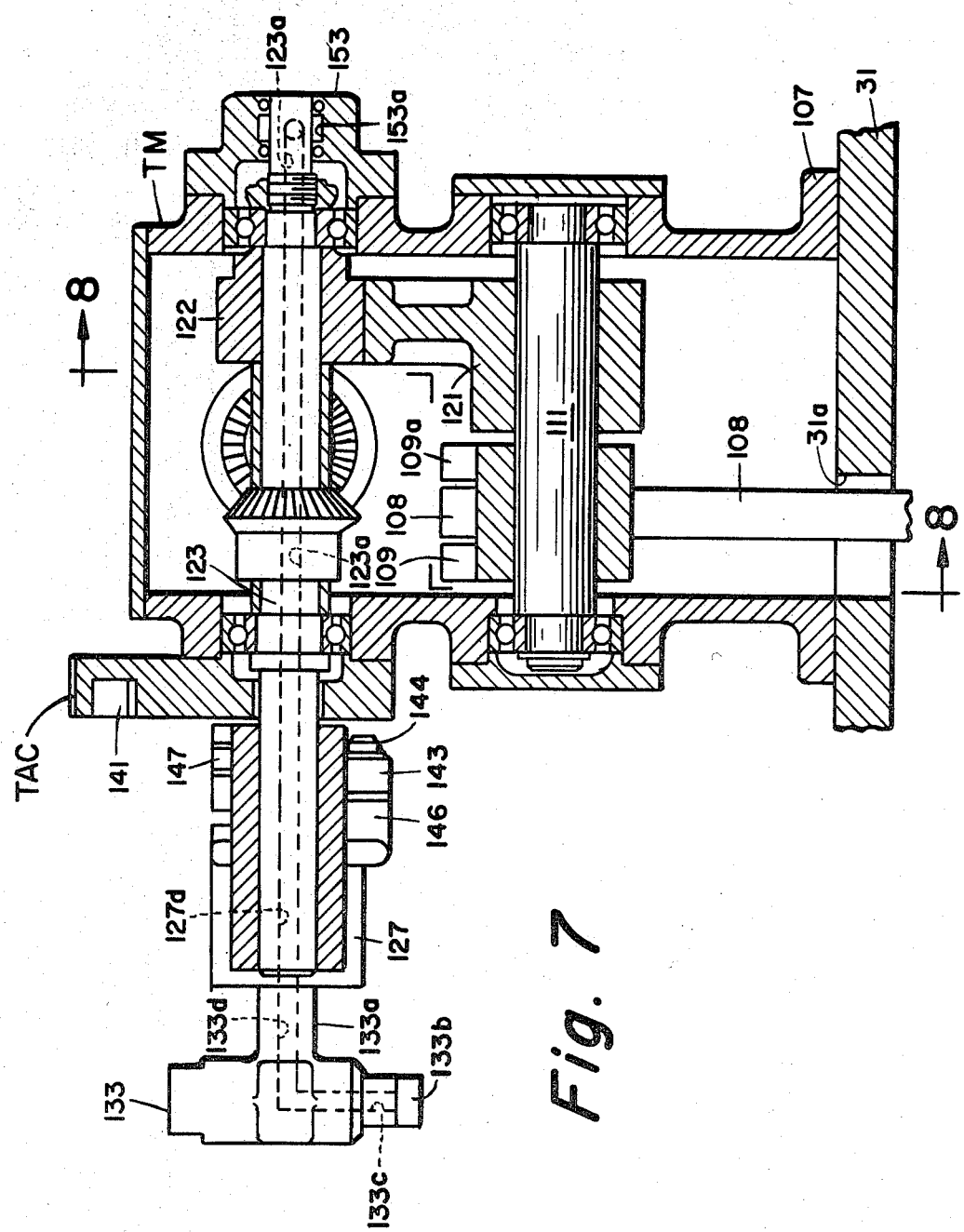
FIG. 7 is a generally cross-sectional view similar to FIG. 5 and taken along line 7-7 of FIG. 5.
Figure 8:
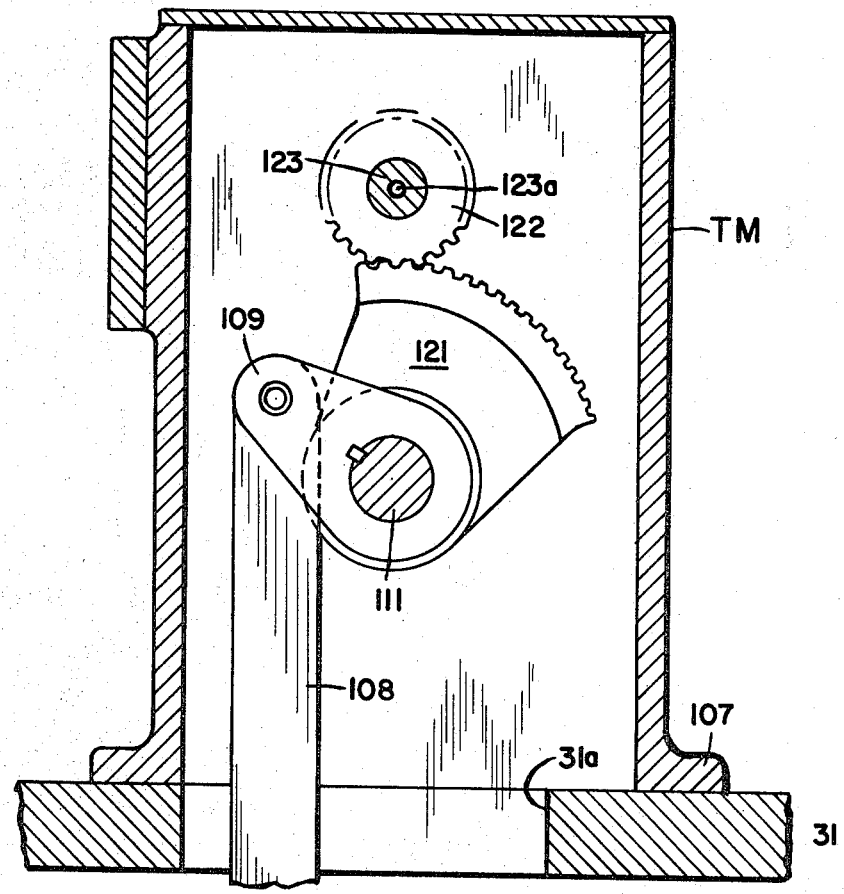
FIG. 8 is a cross-sectional view taken generally along line 8-8 of FIG. 7.

An article transfer mechanism TM is shown in FIGS. 1, 5, 6, 7, 8 and 25. The base 107 of such mechanism is mounted on the top surface of support platform 31 (FIG. 1) and is secured thereto in any convenient manner. As shown in FIGS. 7 and 8 the housing of transfer mechanism TM has an open bottom and rests on the top surface of support platform 31 above a slot 31a in such platform. An actuating rod 108 extends vertically through slot 31a and is pivoted at its upper end between crank arms 109 and 109a which have a common hub portion keyed to a shaft 111 whose ends are supported in suitable bearings disposed in the sides of the housing of transfer mechanism TM as best shown in FIG. 7. The lower end of actuating rod 108 (FIGS. 12 and 25) is pivotally connected to a first end of a lever 112 (FIG. 12) whose opposite end is pivotally connected to a support bracket 113 suitably mounted in enclosure 30 below slot 31a in support platform 31. A cam follower 114 is pivotally connected to lever 112 at approximately the center thereof and such cam follower extends into a cam track 116 provided in a face cam RC which is adjustably secured to a suitable hub which, in turn, is keyed to shaft 118 for driven rotation thereby. (See also FIG. 25).

Referring again to FIG. 8 taken in conjunction with FIGS. 5 and 7 the hub of a gear sector 121 is also keyed to shaft 111 and the teeth of such gear sector mesh with the teeth on a spur gear 122 which is keyed to another shaft 123 embodying a passage 123a concentric with the center of the shaft and extending substantially longitudinally therethrough. By the arrangement just discussed it will be apparent that rotation of shaft 118 will impart similar rotation to cam RC (FIG. 12) causing cam follower 114 on lever 112 to follow cam track 116 in the face of cam RC during said rotation. The previously mentioned first end of lever 112 is thus reciprocatively vertically moved and corresponding movement is imparted through connecting rod 108, crank arms 109 and 109a, shaft 111, and gear sector 121 to spur gear 122. Such movement of spur gear 122 imparts a corresponding or rocking movement to shaft 123 to actuate the remaining apparatus of transfer mechanism TM as discussed below.

With further reference to FIGS. 5, 6 and 7 taken in conjunction with FIG. 1, transfer mechanism TM includes a pair of rocker arms 126 and 127 which are reciprocatively movable through 180° vertically arcuate paths of travel to respectively load an article such as an optical lens blank into the cavity 52 of each article supporting member, such as 51, moved by table 37 to an article transfer or loading station A (FIG. 1) and to simultaneously unload each said article from its associated cavity 52 in the support member such as 51 which is dwelling at such time at an article receiving, unloading or stacking station B indicated in FIG. 1. One end of rocker arm 126 (FIG. 5) is keyed to a first end of a shaft 128 and there is keyed to the second end of such shaft a bevel gear 129 whose teeth mesh with a second bevel gear 131 which is keyed to the previously mentioned shaft 123. One end of rocker arm 127 is keyed to the end of shaft 123 opposite the end to which previously mentioned spur gear 122 is keyed. By such arrangements the reciprocative or rocking movement of shaft 123, as previously discussed, moves rocker arm 127 through its said vertically arcuate path of travel and also imparts a corresponding rotational movement to bevel gear 131 which, in turn, similarly imparts a corresponding rotation to bevel gear 129 and shaft 128 to move rocker arm 126 through its said vertically arcuate path of travel.

The second end of rocker arm 126 rotatably supports a shaft portion 132a of vacuum head or chuck 132 (FIGS. 5 and 6) on the bottom end of which is supported a rubber, article-contacting, vacuum cup 132b. Similarly, the second end of rocker arm 127 rotatably supports a shaft portion 133a of an unloading or takeout vacuum head or chuck 133 (FIGS. 5 and 7) on the bottom end of which is supported a rubber, article contacting, vacuum cup 133b. Referring to FIG. 5, a train of gears 136, 137 and 138 is provided in conjunction with rocker arm 126. Gear 136 is keyed to shaft 128, gear 137 is rotatively supported on the end of a suitable shaft 139 which is affixed to rocker arm 126 in any convenient manner, and gear 138 is keyed to the end of shaft portion 132a of vacuum head or chuck 132. The teeth of gears 136, 137, 138 intermesh with each other and, by such arrangement, when rocker arm 126 is moved through its previously mentioned 180° vertical arc of travel to the position shown in FIG. 1, vacuum head or chuck 132 remains in the vertical position shown in FIG. 7 during the entire course of such movement. Such operation of the gear arrangement shown will be readily apparent to those skilled in the art.

Referring further to FIG. 5 taken in conjunction with FIGS. 6 and 7 a fixed face cam TAC is secured to the housing of transfer unit or mechanism TM, such cam embodying an orifice through which shaft 123 extends. Cam TAC includes a cam track 141 in which a freely rotating cam follower 142 extends, such cam follower being rotatively supported on the free end a short axle whose other end is affixed to a linkage member 143 whose lower end is pivotally connected by a suitable bolt 144 (FIGS. 5 and 7) screwed into an extending boss 146 provided on rocker arm 127. The upper end of linkage member 143 is forked and one end of a second linkage member 147 extends between the prongs of the fork of linkage member 143 and is pivotally connected thereto by an axle 151. The other end of linkage member 147 is pivotally connected to one end of a crank type linkage member 148 by a suitable bolt 149 which is screwed into said one end of member 148. The second end of member 148 is keyed to the end of shaft portion 133a of vacuum head or chuck 133. When rocker arm 127 is actuated by shaft 123 from its position shown in FIG. 5 to its position shown in FIG. 1, cam follower 142 follows cam track 141 and the linkage members 143, 147 and 148 are thereby actuated to the positions shown by the dotted lines in FIG. 6 such linkage members then being indicated by reference characters 143a, 147a, and 148a, respectively. Thus, as will be readily apparent to those skilled in the art, when vacuum chuck or head 133 is moved through its 180° vertically arcuate path of travel by rocker arm 127, such head or chuck is also rotated 90° on the end of rocker arm 127 during such movement and at the end of such movement, the rocker arm and its associated head or chuck occupy the positions shown in FIG. 1. It will be noted that, at such time, vacuum head or chuck 133 extends horizontally so that the rim of an article, carried on the end of the vacuum cup on the end of such chuck, is vertically disposed for delivery to the unloading or stacking station. This will be further discussed later in the description.

One end of a fluid conduit 152 is screwed into a cap member 153 (FIG. 5) which embodies an annular passage or channel 153a, such cap member and channel surrounding the end of the previously discussed shaft 123 which embodies the previously mentioned passage 123a extending longitudinally and substantially therethrough. Passage 123a connects with said annular channel 153a provided in cap member 153 and a short passage 153b is provided in cap member 153 to provide communication between said one end of conduit 152 and annular channel 153a. As schematically illustrated in FIG. 26 the other end of conduit 152 connects to a cam-actuated fluid flow control valve CV1 to be hereinafter discussed. Passage 123a in shaft 123 connects with a passage 127a in rocker arm 127 (FIGS. 5 and 7) which communicates with an annular channel 127b provided in rocker arm 127 and surrounding portion 133a of vacuum head 133. A passage 133d in portion 133a of vacuum head 133 connects with annular channel 127b and thence with passage 127a. A passage 133c (FIGS. 5 and 7) in vacuum head 133 connects passage 133d to atmosphere within the rubber vacuum cup 133b on the end of vacuum head or chuck 133.

A first end of a fluid conduit 155 (FIGS. 1, 5 and 26) is screwed into a portion 154 (FIGS. 1, 5 and 6) of the housing of transfer mechanism TM and connects with an annular channel 128b (FIG. 5) surrounding shaft 128. Such channel, in turn, connects with a passage 128a provided in shaft 128 and extending longitudinally therethrough for a part of the length of such shaft. Passage 128a, in turn, connects with a passage 126a provided in rocker arm 126 and passage 126a connects with a passage 132d extending through shaft portion 132a of vacuum head or chuck 132. Passage 132d connects with a passage 132c extending downwardly through article transfer vacuum head or chuck 132. The lower end of passage 132c communicates with atmosphere within the rubber vacuum cup 132b (FIG. 6) on the end of vacuum head or chuck 132. The second end of conduit 155, as schematically illustrated in FIG. 26, connects to a solenoid-actuated fluid flow control valve SV1 to be hereinafter discussed.

Figure 9:
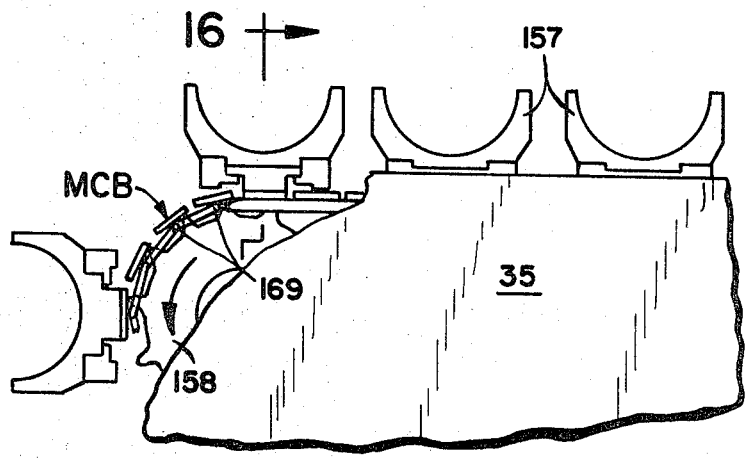
FIG. 9 comprises an elevational view, on an enlarged scale, of part of the apparatus of FIG. 1, such view being taken generally along line 9-9 of FIG. 1.

There is shown in FIGS. 1 and 9, taken in conjunction with FIGS. 9, 16, 17 and 25, an endless magazine conveyor belt MCB which extends in a loop in the usual manner and which carries on its outer periphery a plurality, or series or succession of open ended magazines such as 157, in each of which a plurality or series of the articles handled by the apparatus of the invention are vertically stacked. Each such magazine, such as 157, has a generally semicircular cross-sectional configuration substantially corresponding to the outer periphery of the articles to be stacked therein and each said magazine is intermittently positioned at the previously mentioned article stacking, receiving or unloading station B for receipt or stacking of a plurality of said articles therein. This will be discussed further hereinafter.

As shown in FIGS. 9 and 16, a sprocket wheel 158 is rotatably carried on a shaft 159 (FIGS. 9 and 25) which is supported in suitable bearings 161 and 162. Bearing 161 is supported in a suitable hub member 163 which is secured in any convenient manner to the inner surface of previously mentioned upright support member 35. Bearing 162 is mounted in a suitable support member 164 which is secured in any suitable manner to the top surface of top platform member 31. One end of shaft 159 extends through bearing 162 and is provided with a bevel gear 166 (FIGS. 1 and 25) whose teeth mesh with a second bevel gear 167 mounted on the end of an upright output shaft 168 of a conveyor indexing unit CIU to be discussed hereinafter. The teeth of sprocket wheel 158 contact suitable lug members such as 169 secured to the bottom of magazine conveyor belt MCB and, as hereinafter discussed, the rotation of sprocket wheel 169 in the direction indicated by the arrow thereon in FIG. 9 intermittently drives conveyor belt MCB in the direction indicated by the arrow on one of the magazines, such as 157, in FIG. 1. There is secured to the upper edges of upright support member 35 and support member 164 a pair of guard members 171 and 172, respectively (FIGS. 1 and 16) which maintain the articles stacked in the magazines such as 157 in their stacked positions and also prevent any of the articles from dropping out of the ends of the magazines. Such guard members are omitted in FIG. 9 for purposes of clarity of illustration in such drawing FIG.

Figure 10:
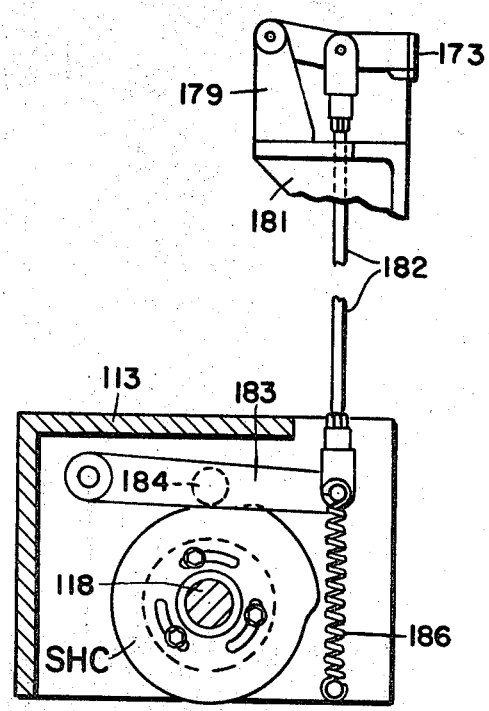
FIGS. 10, 11 and 12 comprise detail views of parts of the apparatus of the invention.
Figure 11:
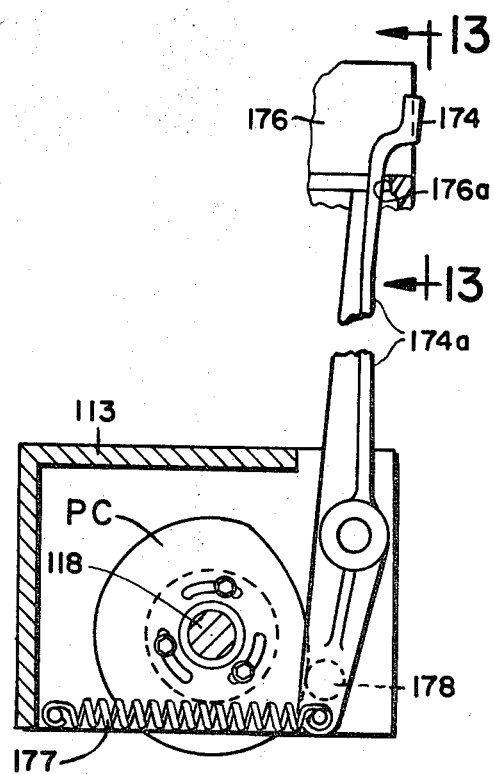
Figure 12:
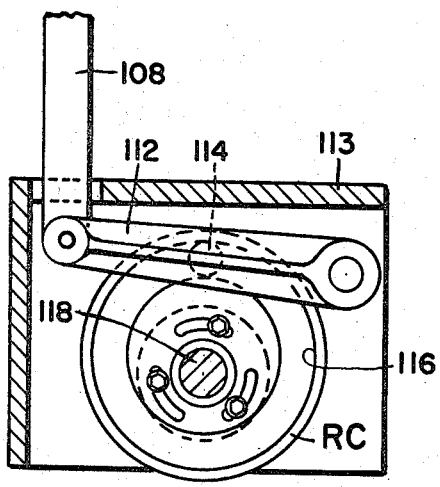
Figure 13:
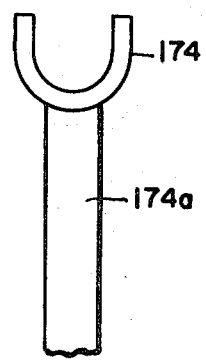
FIG. 13 is an elevational view on an enlarged scale and taken generally along line 13-13 of FIG. 11.
Figure 17:
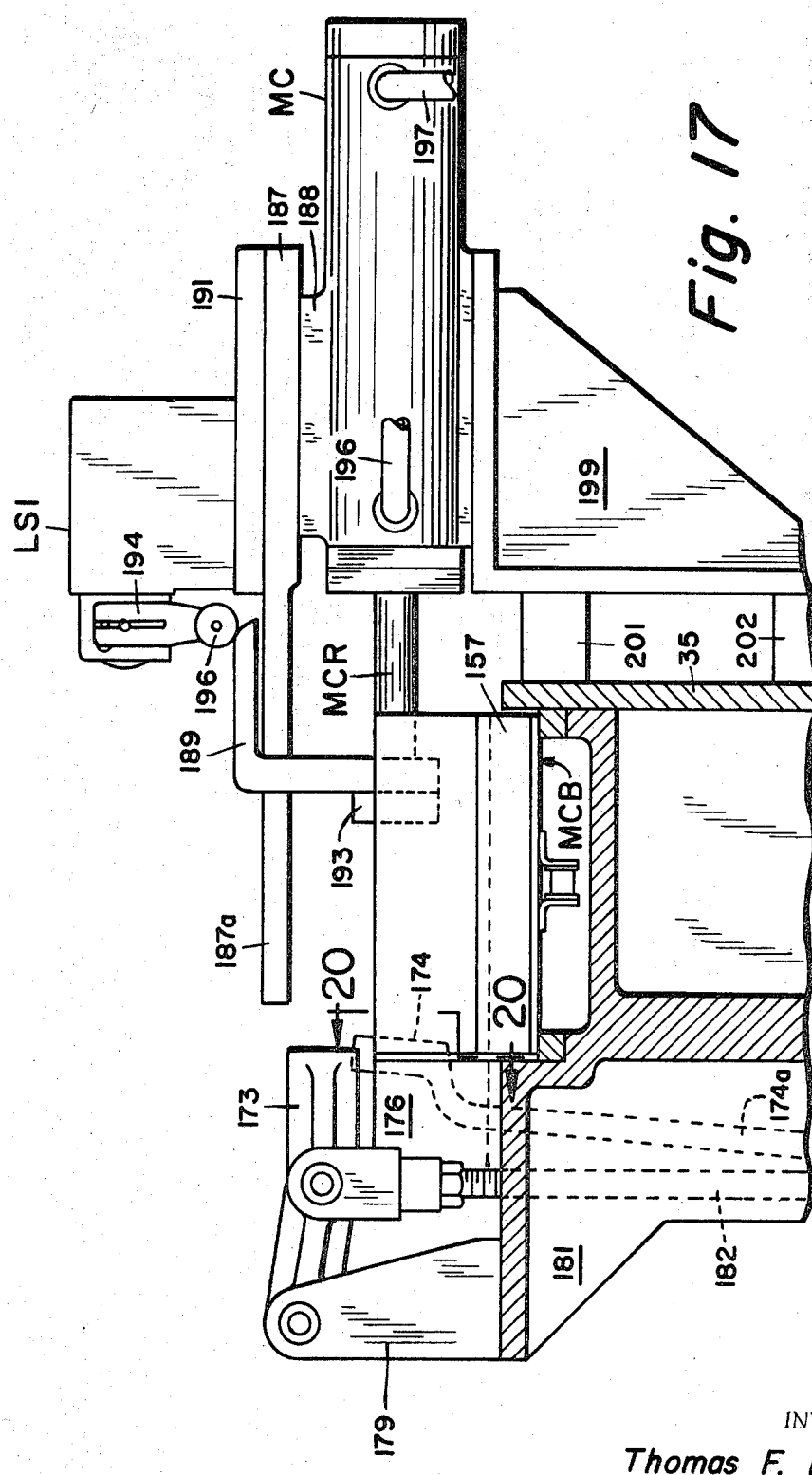
FIG. 17 is an elevational view, partially in cross section and on an enlarged scale, and taken generally along line 17-17 of FIG. 1.

Referring to FIGS. 1, 10, 11, 13, 17 and 20, there is shown a stack holder 173 and an article pusher or projection means 174. An open ended loading trough 176 is also shown in FIGS. 1, 11, 17 and 20, such trough having a cross-sectional configuration (FIG. 20) corresponding to the cross-sectional configuration of each of the magazines such as 157. Trough 176 is also provided with a bottom slot 176a through which an upright actuating arm 174a of pusher 174 vertically extends. It is pointed out that pusher or projection means 174 is shown in FIGS. 11 and 17 in the position it occupies following the projection of an article being handled into one of the magazines such as 157 and such projection means is shown in FIG. 1 in the position it occupies when it is not actuated to so project such an article.

Actuating arm 174a of pusher or projection means 174 is pivoted near the lower end thereof to the previously mentioned support bracket 113 and the extreme lower end of arm 174a is secured to one end of an expansion spring 177 (FIG. 11) whose second end is fastened to bracket 113. A freely rotatable cam follower 178 is pivotally secured to arm 174a adjacent the lower end of such arm and such cam follower bears against the outer periphery of a pusher cam PC (FIGS. 11 and 25) which is adjustably secured to a suitable hub which is, in turn, keyed to previously mentioned shaft 118. It will be readily apparent to those skilled in the art that rotation of shaft 118 will at times cause reciprocative motion of pusher or projection means 174 with the actuating arm 174a of such pusher moving in slot 176a between the front and back of trough 176 (when viewing FIG. 20).

Stack holder 173 has a reverse L shape (viewing FIG. 1) and the base of such L is pivoted at its left hand end (FIGS. 1, 10 and 17) to an upright support 179 whose lower end is fastened to a suitable support bracket 181 (FIGS. 10 and 17).

An upright actuating arm 182 is pivotally connected at its upper end to stack holder 173 and at its lower end to a lever 183 (FIG. 10) adjacent a first end thereof. The second end of lever 183 is pivotally connected to previously mentioned bracket 113. A cam follower 184 is pivotally carried on lever 183 at approximately the center of such lever and such cam follower is biased by a spring 186 so as to bear against the outer periphery of a cam SHC (FIGS. 10 and 25) which is adjustably fastened to a hub which is keyed to previously mentioned shaft 118. Spring 186 is an expansion spring whose lower and upper ends are fastened to bracket 113 and to said first end of lever 183, respectively. It will also be readily apparent to those skilled in the art that rotation of shaft 118 will at times cause reciprocative vertical movement of actuating arm 182 and will, thereby, impart a similar movement to stack holder 173. The movements of pusher 174 and stack holder 173 will be discussed further hereinafter in an operational example of the invention.

There is shown in FIG. 17, taken in conjunction with FIGS. 1 and 26, a pressurized fluid actuated cylinder MC and the usual piston rod MCR. Cylinder MC is mounted on the top of a suitable support bracket 199 which is attached to spacer members 201 and 202 which are in turn secured to support member 35. The end of piston rod MCR is provided with an article contacting button 193 whose purpose will become apparent as the description proceeds. A plate member 187 is secured to the top of a boss 188 provided on the top of cylinder MC, such plate member having an extending guide portion 187a for a limit switch actuating member 189. The lower end of the vertically extending portion of actuating member 189 (FIG. 17) is secured to piston rod MCR immediately behind the above-mentioned button 193. Guide portion 187a of plate member 187 extends through a slot provided in the upper end of said vertically extending portion of limit switch actuating member 189. A limit switch LS1 is secured to the top surface of a support plate 191 which is in turn adjustably fastened to the top surface of plate member 187 by a pair of bolts, such as 192 (FIG. 1) extending through slots provided in support plate 191 and screwed into cooperative threaded holes provided in the top surface of plate member 187.

Limit switch LS1 is provided with an actuating arm 194 which pivotally carries on its bottom end a freely rotatable roller 196. The right hand end of the horizontal portion of limit switch actuating member 189 (viewing FIG. 17) is slightly curved and, when piston rod MCR is sufficiently retracted within cylinder MC, said end of the horizontal portion of member 189 contacts roller 196 to actuate actuating arm 194 of limit switch LS1 by any further retraction of piston rod MCR. Limit switches such as LS1 are well-known in the art and, when such switch is actuated, it closes an electrical contact LS1A (FIG. 26) to complete an electrical control circuit hereinafter discussed. It will be noted that support plate 191 which supports limit switch LS1 is adjustable to vary the distance which piston rod MCR has to be retracted within cylinder MC before roller 196 of switch LS1 is contacted and actuated by actuating member 189. Guide portion 187a of plate member 187 guides actuating member 189 and piston rod MCR during movement of such piston rod.

First ends of pressurized fluid conduits 197 and 198 are connected to first and seconds ends of cylinder MC and the second ends of such conduits connect to solenoid actuated fluid flow control valve SV2 and to cam actuated fluid flow control valve CV2, respectively (FIG. 26) to be discussed hereinafter.

The lower end of an article feed chute 211 is shown in FIG. 1 such end of the chute being disposed above a spaced-apart pair of conveyor belts 212 and 213 which convey the handled articles, such as optical lens blanks, to a shallow cavity 214a embodied in a plate member 214 and having a lower part of a generally semicircular planar configuration corresponding generally to the largest diameter of the articles or lens blanks to be handled. As best illustrated in FIG. 18 the upper part of cavity 214a flares outwardly for optimum receipt and guidance of said articles into the lower part of the cavity. The spacing between belts 213 and 214 can be adjusted by a thumb screw 215 (FIG. 1) the adjustment of which moves the belts, as well as a pair of guide members 216 and 217, closer together or further apart as desired. A motor M2 is connected to belts 212 and 213 through suitable gears so that one of the belts moves at a higher rate of speed than the other. By such an arrangement, broken articles or pieces of articles being handled will be discharged, to the extent possible, from the apparatus before arriving at plate member 214, such discharge of said broken articles or pieces thereof occurring by such items being rotated by the differential speed of the conveyor belts and dropping downwardly in the space therebetween. The apparatus just described forms, per se, no part of the present invention and, therefore, complete details thereof are not shown in the drawings.

Referring to FIGS. 18 and 19 taken in conjunction with FIG. 1, there is shown a horizontally extending arm 203 (FIG. 18) which is mounted on the upper end of an upright support 204 and is secured thereto as by a nut 206. Arm 203 embodies a first fluid passage 203a having one end connecting with a second fluid passage 203b of a relatively small diameter and embodied in a downwardly extending end or nozzle portion 203c of arm 203. The lower end of passage 203b opens to atmosphere in the bottom end of portion 203c of arm 203 which provides an air jet nozzle AJN. The second end of passage 203a connects with the first end of a pressurized fluid conduit 207 whose second end connects with the previously mentioned source of pressurized fluid such as compressed air (FIG. 26). An air jet receiver AJR (FIGS. 18 and 26) is supported in any convenient manner below the orifice 214a in previously mentioned plate member 214 and arm 203 is positioned so that the jet of air issuing from nozzle AJN is directed towards receiver AJR as indicated by the dashed line 218 in FIG. 18 and the dotted line 218 in FIG. 26. Air jet receiver AJR is connected by a suitable piping arrangement, including a length of pipe 219 and suitable associated nipples 221 and 222, to a first end of a conduit 223 whose second end is connected to an air limit switch ALS.

Air limit switches such as ALS are well known and such switch may, for example, be a Type AKW-1, Class 9012 Air Limit Switch such as sold by Square D Company whose address is Executive Plaza, Park Ridge, Ill. The air jet receiver AJS is furnished by said company as a part of the limit switch. Switch ALS includes an electrical circuit controlling contact ALSA (FIG. 26) which is normally closed but is actuated to and is maintained in its open position shown in FIG. 26 when and so long as air jet receiver AJS receives a jet of air from a nozzle such as AJN. Thus, limit switch ALS, and air jet nozzle AJN and receiver AJR, provide a "pneumatic eye" arrangement which detects the presence or absence of an optical lens blank in previously mentioned cavity 214a in member 214. Such arrangement is for the purpose of assuring, to the extent possible, that an article or lens blank disposed in cavity 214a is correctly positioned therein for optimum transfer to one of the article supporting members 51 carried on table 37 (FIG. 1). When an article or lens blank is so positioned in cavity 214a in plate member 214, the air jet issuing from nozzle AJN is not received by receiver AJR since said article or lens blank interferes with the jet. Such interruption of the receipt of the air jet causes closure of circuit controlling contact ALSA of limit switch ALS to close, or initiate the completion of, an electrical circuit discussed later in an operational example of the invention.

As previously mentioned the apparatus of the invention is intended to handle articles such as optical lens blanks or the like having one or more flat sides. Referring to FIG. 1, optical lens blanks, such as 226, each having one flat side, that is, a flat edge on the otherwise circular peripheral edge of each such blank, are being handled by the apparatus. However, articles such as optical lens blanks, or the like, having configurations other than circular but having one or more so-called "- flats" can be handled by the apparatus of the invention. Referring to FIGS. 21, 22 and 23, for example, FIG. 21 illustrates the manner in which a lens blank 226a of a so-called rectangular configuration is rotatively oriented in the article supporting members such as 51. It will be noted that rotating frictional wheel 59 does not contact the longer "flat" of lens blank 226a but is so adjusted that it will contact only the shorter "flat" of such blank. Thus each of a series of lens blanks such as 226a which are being rotatively oriented by the apparatus will be correspondingly rotatively oriented in their respectively associated support members such as 51.

FIG. 22 illustrates the rotative orientation of a lens blank 226b having a configuration commonly termed a "drop-eye" shape. Wheel 59 in FIG. 22 is adjusted so that it will contact only the three shorter and generally flat edge portions of blank 226b and will not contact the longer edge portion of such blank. Thus all of a series of blanks such as 226b can be correspondingly rotatively oriented by the apparatus.

In FIG. 23 there is shown a lens blank 226c having two equal "flats." It is immaterial which of the "flats" of the lens blanks such as 226c are finally disposed adjacent the outer periphery of wheel 59 during the rotative orientation thereof since such lens blanks are symmetrical on opposite sides of a dividing line extending through the center point of each such blank and normal to the "flats" thereon.

Figure 25:
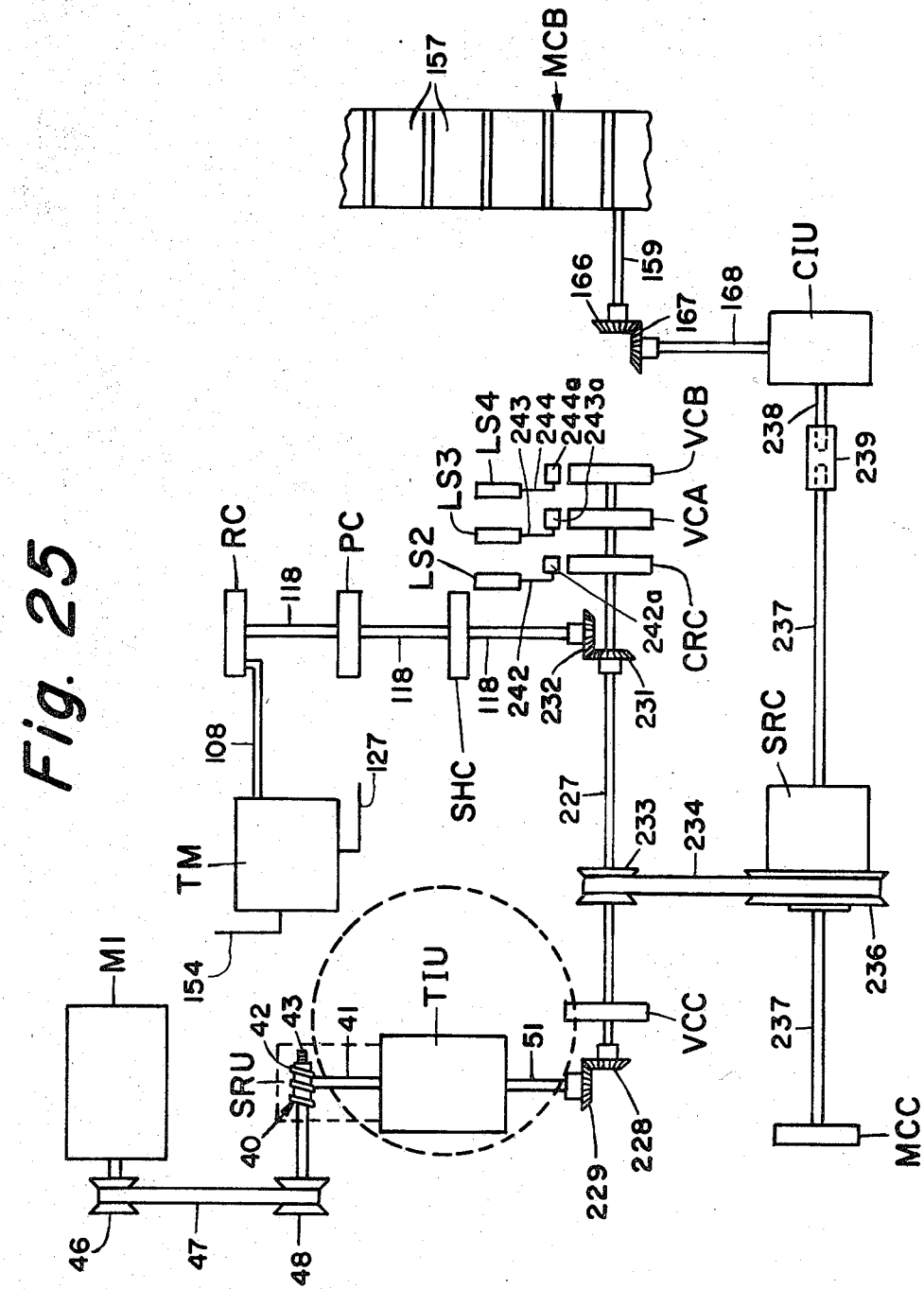
FIG. 25 is a schematic illustration of certain mechanical parts of the apparatus of the invention and mechanical interconnections between said parts.

Referring to FIGS. 25 and 26, there is shown a first cam VCC and a plurality of other cams CRC, VCA, VCB and MCC. Cams VCC, CRC, VCA and VCB are mounted on a shaft 227 which is rotatively driven by bevel gears 228 and 229 secured to shaft 227 and previously mentioned output shaft 51, respectively. Another bevel gear 231 is secured to shaft 227 and the teeth of such gear mesh with a bevel gear 232 keyed to previously discussed shaft 118 for driven rotation thereof and of cams RC, PC, and SHC, previously discussed. A pulley 233 is also keyed to shaft 227 and drives a belt 234 which loops about pulley 236 secured to the driving sleeve of a single revolution clutch SRC whose intermittently driven hub is keyed to a shaft 237. The above mentioned cam MCC is also keyed to shaft 237 and is intermittently driven thereby. Shaft 237 extends completely through clutch SRC and is connected by a coupling 239 to the input shaft 238 of previously mentioned indexing unit CIU.

Single revolution clutches such as clutch SRC mentioned above are well known and such clutch may for example be a Type 6 Single Revolution Clutch which is sold by The Hilliard Corporation, Elmira, N.Y. such clutch being described on pages 1 and 2 of a Bulletin No. 239 published by such company. However, it is expedient to point out, with reference to FIG. 26, that a trip lever TL rides on the outer periphery of clutch trip or release cam CRCA of clutch SRC and normally contacts the step or stop on such cam to maintain the clutch released. The otherwise free end of an actuating rod of a clutch release solenoid CRS is connected to lever TL and, when solenoid CRS is energized as hereinafter discussed, the rod of the solenoid pulls lever TL, against the biasing of a compression spring LRS, from out of contact with the stop on cam CRCA and the clutch engages to drive previously discussed shafts 237 and 238 and, thereby, conveyor indexing unit CIU. Upon deenergization of solenoid CRS, spring LRS actuates lever TL to again contact the periphery of cam CRCA and the clutch is again released when such cam rotates sufficiently that the end of lever TL again contacts the step or stop on the cam. This will be further discussed hereinafter.

Indexing units such as the above mentioned unit CIU are also well-known in the art and such unit may, for example, be a Series E, indexing unit such as sold by Ferguson Machine Company whose address is 7818 Maplewood Industrial Court, St. Louis, Mo. Such a unit is shown on a drawing No. MRG-98-DA of said company.

Referring to FIGS. 14 and 15, the configuration of the outer perimeter of above mentioned cam VCC is illustrated in detail in FIG. 14. The configurations of the outer perimeters of cams CRC, VCA, VCB and MCC are illustrated in detail in FIG. 15, such cams being commonly termed "point" cams for obvious reasons. During rotation of shaft 237 and 227, the points on "point" cams MCC and VCC, respectively (FIGS. 25 and 26) contact and momentarily depress actuating members 241 and 242 of previously mentioned fluid flow control valves CV2 and CV1, respectively (FIG. 26). Also during the rotation of shaft 227 the points on "point" cams CRC, VCA and VCB momentarily contact rollers 243a, 244a, and 245a on the ends of actuating arms 243, 244, and 245, respectively, of limit switches LS2, LS3, and LS4, respectively (FIG. 25) to actuate electrical circuit controlling contacts of such switches. Contacts LS2A and LS3A (FIG. 26) on switches LS2 and LS3 are thereby actuated to their circuit closing positions, and contact LS4A (FIG. 26) is thereby actuated to its circuit opening condition.

The details of the apparatus embodying the invention having been described in the foregoing paragraphs, an operational example of the invention will now be set forth with reference to FIG. 26 of the drawings taken in conjunction with certain of the other drawings where necessary.

It will first be assumed that the source of vacuum and the source of pressurized fluid, such as compressed air for example, are connected to the apparatus shown in FIG. 26. At such time vacuum is supplied to fluid flow control valves CV1 and SV1 (FIG. 26). However, such valves are closed to the flow of vacuum at such time and no such flow therethrough then results. Also, at such time, the compressed air is supplied to fluid flow control valve SV1 which is then open to the flow of such air. Compressed air is also supplied at such time to jet nozzle AJN, to rotary union RU, and to fluid flow control valves CV2 and SV2. Valves CV2 and SV2 are closed to the flow of compressed air at such time and, therefore, no flow of compressed air therethrough then occurs. However, as mentioned above, the compressed air flows through valve SV1 and thence through conduit 155 to vacuum head 132 on rocker arm 126. The compressed air at such time, also flows through conduit 207 to air jet nozzle AJN and the jet of such air issuing from the nozzle will enter receiver AJR, and thence flow to conduit 223 and to air limit switch ALS. Contact ALSA of such switch is thus actuated, at such time, to its open position shown. The compressed air, at such time, also flows through conduit 106 to rotary union RU and thence through conduit 104 to air motor AM and then to atmosphere. Motor AM is thereby energized to drive shaft 96 through gear reduction unit GRU, and the orienting wheels or rollers such as 59 (FIG. 1) are rotated for the rotational orientation of lens blanks such as 226 subsequently supplied to support members 51 as hereinafter described. It is pointed out that the supply of compressed air to air motor AM and to air jet nozzle AJN is continued so long as the apparatus is under operation.

There is shown in FIG. 26 a master switch MS which is actuated or depressed to close a circuit from terminal BX of the previously mentioned source of electrical current to the input terminal of a potentiometer POT and to the control windings of other components or to electrical circuit controlling contacts employed in the invention. At such time motors M1 and M2 are energized to start actuation of the apparatus of the invention and the driving of conveyor belts 212 and 213, respectively. Motor M1 is, of course, energized and will drive its associated apparatus at a speed in accordance with the setting of potentiometer POT, as is well-known. It will be assumed that, at such time, a series or succession of articles such as the optical lens blanks 226 shown in FIG. 1 are being supplied to conveyor belts 212 and 213 by chute 211 and are being conveyed by said belts towards cavity 214a in plate member 214. It will be further assumed that rocker arms 126 and 127 are, at the start up of the apparatus, dwelling in the positions shown in FIG. 5 of the drawings, that is, with vacuum chucks 132 and 133 disposed above the article or lens blank supporting members such as 51 then positioned at stations A and B respectively (FIG. 1). It will also be assumed that table indexing unit TIU (FIG. 2) is in its dwell position at the start up of the apparatus and, therefore, table 37 is dwelling in one of its dwell positions as shown in FIG. 1. It will be still further assumed that pusher or projection means 174 and stock holder 173 are, at the start up of the apparatus, in their positions shown in FIG. 1, and that the piston rod MCR of magazine cylinder mc. is in its extended position shown in FIG. 26.

Under the above assumed conditions, the first operation of the apparatus that takes place is that of cam VCC contacting and depressing actuating arm 242 of flow control valve CV1 (FIG. 26) to actuate such valve against the force of compression spring 246 associated with the valve and, thereby, permit vacuum flow through the valve and conduit 152 to takeout or vacuum chuck 133. The next operation of the apparatus that takes place is the downward movement of actuating arm or rod 108 by rotation of cam RC (FIG. 12) to actuate gear sector 121 (FIG. 8) and thereby initiate the movement of rocker arms 126 and 127, and their respective vacuum chucks 132 and 133, toward their article loading and unloading positions, respectively, shown in FIG. 1.

When one of the articles or blanks such as 126 is delivered to cavity 214a in plate member 214 (FIG. 1) in a suitable position, the air jet then being received by receiver AJR is interrupted and air limit switch ALS is, thereby, actuated to close its contact ALSA (FIG. 26). The closing of such contact prepares an energizing circuit for the control winding 247 of a relay RN (FIG. 1) and to the solenoid winding S1 of a flow control valve SV1. Subsequently, previously mentioned cam VCA actuates limit switch LS3 (FIG. 25) and such switch momentarily closes its contact LS3A (FIG. 26) to complete the energizing circuits to the control winding 247 of relay RN and to the solenoid winding S1 of flow control valve SV1 (FIG. 26). Relay RN closes its contact R1A (FIG. 26) and second energizing circuits to windings 247 of relay RN and S1 of valve SV1, and including normally closed contact LS4A of limit switch LS4, are thereby completed. Contact LS3A reopens due to the further rotation of cam VCA but said windings of relay RN and valve SV1 remain energized over the circuit including contact LS4A of limit switch LS4 and contact R1A of relay RN. The energization of solenoid winding S1 of valve SV1 actuates such valve against the force of compression spring 248 associated with the valve and the supply of compressed air through valve SV1 to transfer vacuum chuck 132 is terminated while the source of vacuum is connected through valve SV1 to such vacuum chuck.

It is pointed out that, if the jet of air 218 from nozzle AJN and directed to receiver AJR is not interrupted by an article or lens blank, such as 226, positioned in cavity 214a of plate member 214 (FIG. 1) air limit switch is not actuated, and windings 247 and S1 of relay RN and valve SV1, respectively, are not energized to actuate valve SV1 to terminate the supply of compressed air to transfer or vacuum chuck 132 and supply vacuum thereto. This arrangement prevents, to the extent possible, the transfer of an article or lens blank, which is not correctly positioned in cavity 214a, to one of the article supporting members such as 51 on table 37. This assures, to the extent possible, that the articles or lens blanks transferred to said supporting members such as 51 will be transferred so as to be deposited in the cavity 52a of each respective member 51.

Subsequent to the supply of vacuum to transfer chuck 132 as discussed above, rocker arm 126 completes the movement of such chuck to its position shown in FIG. 1 and the chuck contacts the upper surface of the article or lens blank then in cavity 214a of plate member 214. Simultaneously with such completion of the movement of chuck 132, rocker arm 127 completes the movement of vacuum chuck 133 to its position shown in FIG. 1, as will be readily apparent. Since there are no articles or lens blanks such as 126 in the article supporting members such as 51 at the start up of the apparatus, chuck 133 is not carrying such an article at such time and, therefore, no stacking takes place at such time. For purposes of the operational example of the invention therefore, it will now be further assumed that the apparatus has operated for a sufficient length of time that one of the articles or lens blanks is now being supported in each of the article supporting members such as 51, shown in FIG. 1, with the exceptions of the article supporting member then positioned at station B indicated in FIG. 1 and the article supporting member immediately following the member then positioned at such station.

Under the above assumed conditions, the next actuation of the apparatus that occurs is the further rotation of cam VCC (FIG. 26) so that it no longer contacts operating arm 242 of valve CV1. Spring 246 of such valve then actuates the valve to interrupt the supply of vacuum to takeout or vacuum chuck 133 to permit optimum transfer of an article or lens blank such as 226 from such chuck to previously mentioned trough 176 when the chuck is carrying such an article.

Just prior to the arrival of vacuum chucks 132 and 133 at their positions shown in FIG. 1, table indexing unit TIU (FIG. 2) starts to rotate table 37 counterclockwise through a 60° arc of travel, such movement being completed prior to the return of vacuum chucks 132 and 133 to their positions shown in FIG. 5, as hereinafter discussed. Such movement of table 37 indexes to stations A and B, respectively, the article supporting members such as 51 which then immediately precede stations A and B, and such members then dwell at such stations for a brief period of time.

Following a brief dwell period of chucks 132 and 133 in their positions shown in FIG. 1, and the termination of vacuum to chuck 133 as mentioned above, further rotation of cam RC (FIGS. 12 and 25) actuates arm or rod 108 in an upward direction to return gear sector 121 (FIG. 8) towards its positions shown in such drawing and, thereby, move rocker arms 126 and 127 and their associated vacuum chucks 132 and 133, respectively, towards their positions shown in FIG. 5. Vacuum chuck 132, at the initiation of said movement, removes the article or lens blank from cavity 214a of plate member 214 and transfers such article or lens blank to the cavity 52a in the article supporting member, such as 51, then at station A (FIG. 1). Following such transfer, the point of cam VCB (FIG. 26) actuates limit switch LS4 to momentarily open its contact LS4A and the energizing circuits to the windings 247 of relay RN and S1 of valve SV1 are deenergized. Relay RN opens its contact R1A and valve SV1 is actuated by its associated spring 248 to interrupt the supply of vacuum to transfer vacuum chuck 132 and supply compressed air to such chuck to assure rapid transfer of said article or lens blank from the vacuum chuck to said cavity 52a.

At substantially the same time that takeout chuck 133 arrives at its position shown in FIG. 5, cam VCC again contacts and depresses actuating rod 242 of valve CV1 to actuate such valve to supply vacuum to conduit 152 and thence to chuck 133. Such vacuum causes chuck 133 to pick up the article or lens blank, such as 226, then in cavity 52a of the article supporting member, such as 51, in preparation for transfer of such article to trough 176 for stacking of the article in one of the magazines such as 157, as discussed below.

The foregoing described operations of transfer arms 126 and 127 and their associated vacuum chucks 132 and 133, and of table 37 are successively repeated during any period of operation of the apparatus of the invention.

Referring further to FIG. 1 of the drawings taken in conjunction with FIGS. 3 and 4, the rotating frictional wheels, such as 57, are maintained out of contact with the outer periphery of each article or lens blank, such as 226, when the respective support member, such as 51, which carries such article or lens blank, is located at stations A or B. This is accomplished by the outer periphery of cam track 88 contacting the cam followers 91 (FIGS. 3 and 4) when each respective article support member such as 51 is at said stations. When, however, table 37 moves the support members such as 51 between stations A and B during the counterclockwise periodic indexing of such table, each respective wheel such as 59 contacts the outer periphery of the article or lens blank positioned in the cavity 52a of the support member such as 51 with which the respective wheel is associated. This occurs since the cam follower, such as 91, associated with such wheel is not then contacting cam track 88. Thus the articles or lens blanks, such as 226, being carried by the member such as 51 between said stations A and B are rotatively correspondingly oriented in a manner similar to that previously discussed in conjunction with FIGS. 21, 22 and 23 of the drawings.

Just subsequent to the transfer of each article or lens blank such as 226 to trough 176 (FIGS. 1, 17 and 20) by vacuum chuck 133 as discussed above, cam PC (FIGS. 11 and 25) actuates arm 174a of pusher or projection means 174 to project or move the respective article or lens blank through trough 176 and towards the magazine such as 157 then located adjacent the end of such trough. Prior to said article or lens blank contacting stack holder 173 (FIGS. 1 and 10) during said projection or movement of the article or lens blank through trough 176, stack holder cam SHC (FIG. 10) actuates arm or rod 182 to move stack holder 173 upwardly and out of the path of movement of the respective article or lens blank moving through trough 11. Such article or lens blank is then projected by pusher 174 into contact with the last preceding article stacked in the magazine and stack holder 173 is then actuated downwardly to again hold the stack of articles or lens blanks in their vertical positions in the magazine, such as 157, then being loaded. Pusher or projection means 173 is then reactuated by cam PC to its position shown in FIG. 1. Such operation will be readily apparent to those skilled in the art.

As previously mentioned, piston rod MCR of magazine cylinder MC (FIGS. 1, 17, 26) is assumed to be in its extended position at the start up of the apparatus. Such piston rod, therefore, extends through the semicircular stacking cavity of the magazine such as 157 positioned at such time in alignment with trough 176. Thus, as each successive article supplied to trough 176 is projected therethrough and into the stacking cavity of the respective magazine, piston rod MCR is moved into cylinder MC a distance generally corresponding to the thickness of the respectively projected article. Such operation is repeated for each article projected into said magazine and, subsequently, the previously discussed limit switch actuating member 189 (FIGS. 1 and 17) contacts and actuates actuating arm 194 of limit switch LS1 to close electrical circuit controlling contact LS1A (FIG. 26) of such limit switch. This prepares energizing circuits for the previously mentioned clutch release solenoid CRS and for a solenoid S2 of a fluid flow control valve SV2 (FIG. 26) which is normally biased to its position shown by a spring 251.

When clutch cam CRC (FIG. 26) next actuates its associated limit switch LS2 (FIG. 25) contact LS2A of such limit switch is momentarily closed to complete the above mentioned energizing circuits. The energization of solenoid S2 of valve SV2 actuates such vale to momentarily supply pressurized fluid or compressed air to conduit 196 and thence to cylinder MC to cause the piston rod MCR of such cylinder to be retracted within the cylinder and out of the magazine containing the succession of articles or lens blanks just stacked and, thereby, permit movement of such magazine by magazine conveyor belt MCB previously mentioned. The above-mentioned energization of clutch release solenoid CRS momentarily actuates trip lever TL (FIG. 26) upwardly to release single revolution clutch SRC and cause a single revolution of shaft 237 (FIG. 25) which, in turn, actuates indexing unit CIU to impart movement to conveyor belt MCB, in the direction indicated by the arrow in FIG. 1, to move the stacked magazine out of alignment with trough 176 and move the next succeeding magazine on conveyor belt MCB into such alignment for stacking of such succeeding magazine.

The single revolution of shaft 237 as discussed above also rotates cam MCC (FIG, 25) which, immediately following said movement or indexing of the next succeeding magazine on conveyor belt MCB into alignment with trough 176, momentarily contacts and depresses actuating arm 241 of a fluid flow control valve CV2 (FIG. 26) against the biasing of such valve by a spring 252 to its position shown. Such actuation of arm 241 actuates valve CV2 to momentarily supply presurized fluid or compressed air to conduit 197 whence it is supplied to cylinder MC for actuation of piston rod MCR of the cylinder through the article stacking cavity of said next succeeding magazine moved or indexed, as discussed above, into alignment with trough 176. Such movements of the apparatus will, of course, occur each time a preselected number or quantity of the articles or lens blanks such as 226 are stacked into one of the magazines such as 157. It is pointed out, however, that such number or quantity can be varied by adjustment of limit switch LS1 (FIGS. 1 and 17) closer to or further away from conveyor belt MCB. Such adjustment permits actuating member 189 to actuate arm 194 of limit switch LS1 in accordance with any preselected number or quantity of articles or lens blanks to be stacked in the magazines such as 157, as is readily apparent.

It is pointed out that the apparatus of the invention can also be employed for rotationally orienting articles such as optical lens blanks of somewhat larger or smaller diameters than those illustrated and stacking preselected quantities of such articles. This may be accomplished by substituting for the article support members, such as 51 on table 37, article support members embodying cavities having diameters corresponding to the diameters of the somewhat larger or smaller articles to be oriented and stacked. Conveyor belts 212 and 213, and guide members 216 and 217 (FIG. 1) are also correspondingly adjusted closer together or further apart to accommodate the articles of smaller or larger diameters, respectively. Under such conditions, the magazines such as 157 on conveyor belt MCB, and trough 176, are also changed to correspond to the diameters of the articles to be stacked and having a smaller or a larger diameter than the articles such as 226 illustrated in FIG. 1. This will be readily apparent to those skilled in the art.

I claim:

1. Apparatus for similarly rotatively orienting each of a plurality of similar flat or relatively shallow dishlike articles having generally circular rims with at least one relatively flat side, such apparatus comprising:
 A. an article supporting member embodying an open-top shallow cavity having a horizontal planar configuration of a major segment of a circle whose diameter substantially corresponds to the largest diameter of the rims of said articles, the perimeter of such cavity being defined by an arcuate inner surface of a wall having a gap therein;
 B. means for individually depositing each of said plurality of articles in said cavity for a period of dwell therein, such deposition of each such article in said cavity being performed with at least a portion of the rim of the respective article positioned adjacent said inner surface of said wall and with such article in a random rotative orientation with respect to said cavity;
 C. a rotating wheel having an outer perimeter a portion of which, during at least a part of each said dwell period, extends into said gap in said wall to frictionally contact the circular portion of the rim of each respective article deposited in said cavity with such circular portion of such rim positioned adjacent said gap, whereby each such article is similarly rotatively oriented in said cavity by said wheel; and
 D. means actuated, following each said dwell period, for removing each respective article from said cavity.

2. Apparatus in accordance with claim 1 and in which said article depositing means and said article removing means each comprise a vacuum chuck.

3. Apparatus in accordance with claim 2 and in which said vacuum chucks are carried on the otherwise free ends of respectively associated rocker arms which are reciprocatively movable through approximately 180° vertically arcuate paths of travel for respectively depositing and removing said articles in and from said supporting member.

4. Apparatus in accordance with claim 1 and in which said articles are optical lens blanks.

5. In combination with apparatus delivering to an article transfer station each of a succession of flat or relatively shallow dishlike articles having at least partially circular rims with at least one relatively flat side, an additional apparatus for further handling said articles to identically rotatively orient such articles and further deliver such oriented articles to an article receiving station or the like, such additional apparatus comprising:

A. a rotatable table carrying adjacent its outer periphery a plurality of equally spaced apart and similar article supporting members each embodying a relatively shallow cavity having a horizontal cross-sectional configuration of the major segment of a circle the diameter of which corresponds to the largest diameter of each of said articles, the perimeter of each said cavity being defined by an arcuate inner surface of a wall having a gap therein;

B. a rotatable article orienting wheel associated with each said article supporting member, each such wheel being carried by said table and being resiliently biased in a direction so that a portion of the outer periphery of each respective wheel normally extends into said gap in said wall of the respectively associated member to at least at times frictionally contact the rim of one of said articles disposed in the cavity of such associated member;

C. means for intermittently rotating said table to periodically and successively position each of said article supporting members at said article transfer station, at least one article orienting station, and then at said article receiving station;

D. means for rotating each said article orienting wheel at least at each said article orienting station;

E. a first vacuum chuck associated with said article transfer station, such chuck being reciprocatively actuable through an approximately 180° vertically arcuate path of travel to contact and transfer successive ones of said articles delivered to said article transfer station to successive ones of said article supporting members positioned at such transfer station, each said article being so transferred with the rim thereof horizontally disposed within said cavity of the respective article supporting member;

F. a second vacuum chuck associated with said article receiving station, such chuck being reciprocatively actuable through an approximately 180° vertically arcuate path of travel to contact and transfer to said article receiving station each of said articles delivered to such station by each said article supporting member; and G. means for reciprocating actuating said chucks through their said arcs of travel in a time relationship with said positioning by said table of said article supporting means at said article transfer and article receiving stations, such time relationship being such that said articles are transferred by said chucks as stated.

6. Apparatus in accordance with claim 5 and in which said vacuum chucks are carried on the otherwise free ends of rocker arms for movement through said vertically arcuate paths of travel.

7. Apparatus in accordance with claim 6 and in which said articles are optical lens blanks.

8. Apparatus in accordance with claim 6 and further including at said article transfer station a pneumatic eye means for detecting correct positioning of each said article at said transfer station for correct contacting and transfer of the respective article by said first vacuum chuck to the respective said article supporting member positioned at said transfer station, such pneumatic eye means partially controlling the supply of vacuum to said first vacuum chuck and preventing such supply if such means detects incorrect positioning of one of said articles at said transfer station.

9. Apparatus in accordance with claim 5 and in which said articles are optical lens blanks.

10. Apparatus in accordance with claim 9 and further including at said article transfer station a pneumatic eye means for detecting correct positioning of each said article at said transfer station for correct contacting and transfer of the respective article by said first vacuum chuck to the respective said article supporting member positioned at said transfer station, such pneumatic eye means partially controlling the supply of vacuum to said first vacuum chuck and preventing such supply if such means detects incorrect positioning of one of said articles at said transfer station.

11. Apparatus in accordance with claim 5 and further including at said article transfer station a pneumatic eye means for detecting correct positioning of each said article at said transfer station for correct contacting and transfer of the respective article by said first vacuum chuck to the respective said article supporting member positioned at said transfer station, such pneumatic eye means partially controlling the supply of vacuum to said first vacuum chuck and preventing such supply if such means detects incorrect positioning of one of said are articles at said transfer station.

12. In combination with apparatus delivering to an article transfer station each of a succession of flat or relatively shallow dishlike articles having completely circular rims or generally circular rims having at least one flat side, an additional apparatus for further handling said articles to identically rotatively orient such articles and stack equal preselected quantities of the articles in each of a plurality of open ended magazines carried on an endless conveyor belt for delivery of stacks of such articles to an inspection station or the like, such additional apparatus comprising:

A. a rotatable table carrying adjacent its outer periphery a plurality of equally spaced apart and similar article receiving members each embodying a relatively shallow cavity having a horizontal cross-sectional configuration of the major segment of a circle the diameter of which corresponds to the largest diameter of each of said articles, the perimeter of each said cavity being defined by an arcuate inner surface of a wall having a gap therein;

B. a rotatable article orienting wheel associated with each said article receiving member, each such wheel being carried by said table and being resiliently biased in a direction so that a portion of the outer periphery of each respective wheel normally extends into said gap in said wall of the respectively associated member to at least at times frictionally contact the rim of one of said articles disposed in the cavity of such associated member;

C. means for intermittently rotating said table to periodically and successively position each of said article receiving members at said article transfer station, at least one article orienting station, and then at an article stacking station;

D. means for rotating each said article orienting wheel at least at each said article orienting station;

E. a first vacuum chuck associated with said article transfer station such chuck being reciprocatively actuable through an approximately 180° vertical path of travel to contact and transfer successive ones of said articles delivered to said article transfer station to successive ones of said article receiving members positioned at such transfer station, each said article being so transferred with the rim thereof horizontally disposed within said cavity of the respective article receiving member;

F. an open ended loading trough located at said article stacking station;

G. a second vacuum chuck associated with said article stacking station, such chuck being reciprocatively actuable through an approximately 180° arcuate path of travel to contact and transfer to said loading trough each of said articles delivered to said article stacking station by each said article receiving member, each said article being so transferred with the rim thereof substantially vertically oriented;

H. means for projecting each of said articles transferred to said loading trough through a horizontal path of travel extending normal to the plane of the vertically oriented rim of each such article and into the one of said magazines then aligned with the loading trough at said stacking station, such projection of said articles stacking such articles in said magazine with each succeeding article in a facing relationship with the immediately preceding article so stacked;

I. means for reciprocatively actuating said chucks through their said arcs of travel in a time relationship with said positioning by said table of said article receiving members at said article transfer and article stacking station, such time relationship being such that said articles are transferred by said chucks as stated;

J. means for reciprocatively actuating said projection means in a time relationship with the transfer of each said article to said loading trough, such time relationship being such that each said article is projected as stated and the projection means returns to an article projection position prior to the transfer of the next such article to the loading trough; and K. means for periodically stepping said conveyor belt to align with said loading trough the next succeeding one of said magazines carried on such belt, such means being energized to so step the conveyor belt following the stacking of a preselected number of said articles in the magazine immediately preceding such next succeeding one of such magazines.

13. Apparatus in accordance with claim 12 and in which said articles are optical lens blanks.

14. Apparatus in accordance with claim 13 and further including at said article transfer station a pneumatic eye means for detecting correct positioning of each said article at said transfer station for correct contacting and transfer of the respective article by said first vacuum chuck to the respective said article supporting member positioned at said transfer station, such pneumatic eye means partially controlling the supply of vacuum to said first vacuum chuck and preventing such supply if such means detects incorrect positioning of one of said articles at said transfer station.

15. Apparatus in accordance with claim 12 and further including at said article transfer station a pneumatic eye means for detecting correct positioning of each said article at said transfer station for correct contacting and transfer of the respective article by said first vacuum chuck to the respective said article supporting member positioned at said transfer station, such pneumatic eye means partially controlling the supply of vacuum to said first vacuum chuck and preventing such supply if such means detects incorrect positioning of one of said articles at said transfer station.